United States Patent
Banin et al.

(10) Patent No.: US 9,957,442 B2
(45) Date of Patent: May 1, 2018

(54) ANISTROPIC SEMICONDUCTOR NANOPARTICLES

(75) Inventors: Uri Banin, Mevasseret Zion (IL); Adiel Zimran, Efrat (IL); Itai Lieberman, Tel Aviv (IL); Amit Sitt, Tel Aviv (IL)

(73) Assignee: Yissum Research Development Company of the Hebrew University of Jerusalem Ltd., Jerusalem (IL)

( * ) Notice: Subject to any disclaimer, the term of this patent is extended or adjusted under 35 U.S.C. 154(b) by 409 days.

(21) Appl. No.: 13/809,185

(22) PCT Filed: Sep. 15, 2011

(86) PCT No.: PCT/IL2011/000734
§ 371 (c)(1),
(2), (4) Date: Jan. 9, 2013

(87) PCT Pub. No.: WO2012/035535
PCT Pub. Date: Mar. 22, 2012

(65) Prior Publication Data
US 2013/0115455 A1    May 9, 2013

Related U.S. Application Data

(60) Provisional application No. 61/383,413, filed on Sep. 16, 2010.

(51) Int. Cl.
*C09K 11/88* (2006.01)
*C09K 11/02* (2006.01)
(Continued)

(52) U.S. Cl.
CPC .......... *C09K 11/883* (2013.01); *C09K 11/025* (2013.01); *C09K 11/565* (2013.01);
(Continued)

(58) Field of Classification Search
CPC . C09K 11/025; C09K 11/565; C09K 11/7492; C09K 11/88; C09K 11/02;
(Continued)

(56) References Cited

U.S. PATENT DOCUMENTS 6,225,198 B1    5/2001    Alivisatos et al.
6,306,736 B1    10/2001   Alivisatos et al.
(Continued)

FOREIGN PATENT DOCUMENTS

WO    WO 2006134599 A1 * 12/2006

OTHER PUBLICATIONS

Aharoni et al., "Synthesis of InAs/CdSe/ZnSe Core/Shell1/Shell2 Structures with Bright and Stable Near-infrared Fluorescence," *Journal of the American Chemical Society*, 2006, vol. 128, No. 1, pp. 257-264.
(Continued)

*Primary Examiner* — Hai Vo
(74) *Attorney, Agent, or Firm* — Vorys, Sater, Seymour and Pease LLP

(57) ABSTRACT

The present invention provides seeded rod (SR) nanostructure systems including an elongated structure embedded with a seed structure being a core/shell structure or a single-material rod element. The SR systems disclosed herein are suitable for use in a variety of electronic and optical devices.

17 Claims, 14 Drawing Sheets

(51) Int. Cl.
*C09K 11/56* (2006.01)
*C09K 11/70* (2006.01)
*C09K 11/74* (2006.01)
*B82Y 40/00* (2011.01)

(52) U.S. Cl.
CPC .......... *C09K 11/70* (2013.01); *C09K 11/7492* (2013.01); *B82Y 40/00* (2013.01); *Y10S 977/773* (2013.01); *Y10S 977/892* (2013.01); *Y10T 428/2933* (2015.01)

(58) Field of Classification Search
CPC . C09K 11/883; C09K 11/70; Y10T 428/2933; Y10T 428/2991; Y10T 428/2996; Y10T 428/2993; Y10T 428/2982; Y10T 428/2995; B82Y 40/00; B82Y 30/00; B82Y 10/00; B82Y 20/00; C30B 29/60; C30B 7/005; C30B 7/00; C30B 29/605; C30B 29/40; H01L 33/24; H01L 33/08; H01L 33/30; H01S 5/3214; H01S 5/3401; H01S 5/3412; H01S 5/3432; H01S 5/347; H01S 5/341; H01S 5/10; G06N 99/002; C01B 25/082; Y10S 977/773; Y10S 977/892
USPC ..... 977/759, 936, 773, 892; 117/1; 428/375, 428/403, 404, 405, 406; 252/500, 518.1, 252/519.4, 521.5
See application file for complete search history.

(56) References Cited

U.S. PATENT DOCUMENTS

| | | | |
|---|---|---|---|
| 6,788,453 | B2 | 9/2004 | Banin et al. |
| 7,125,605 | B2 | 10/2006 | Bawendi et al. |
| 7,172,791 | B2 | 2/2007 | Treadway et al. |
| 7,303,628 | B2 | 12/2007 | Alivisatos et al. |
| 2003/0214699 | A1 | 11/2003 | Banin et al. |
| 2005/0054004 | A1 | 3/2005 | Alivisatos et al. |
| 2005/0129947 | A1 | 6/2005 | Peng et al. |
| 2005/0211154 | A1 | 9/2005 | Alivisatos et al. |
| 2009/0230382 | A1 | 9/2009 | Banin et al. |
| 2010/0090164 | A1 | 4/2010 | Peng et al. |
| 2012/0211670 | A1* | 8/2012 | Choi ............... B82Y 20/00 250/459.1 |

OTHER PUBLICATIONS

Zimmer et al., "Size Series of Small Indium Arsenide-Zinc Selenide Core-Shell Nanocrystals and Their Application to In Vivo Imaging," *Journal of the American Chemical Society*, 2006, vol. 128, No. 8, pp. 2526-2527.
Fu et al., "Semiconductor Quantum Rods as Single Molecule Fluorescent Biological Labels," *Nano Letters*, 2007, vol. 7, No. 1, pp. 179-182.
Rothenberg et al., "Electric Field Induced Switching of the Fluorescence of Single Semiconductor Quantum Rods," *Nano Letters*, 2005, vol. 5, No. 8, pp. 1581-1586.
Allen et al., "InAs(ZnCdS) Quantum Dots Optimized for Biological Imaging in the Near-Infrared," *Journal of the American Chemical Society*, 2010, vol. 132, No. 2, pp. 470-471.
Tessler et al., "Efficient Near-Infrared Polymer Nanocrystal Light-Emitting Diodes," *Science*, 2002, vol. 295, No. 5559, pp. 1506-1508.
Kazes et al., "Lasing from Semiconductor Quantum Rods in a Cylindrical Microcavity," *Advanced Materials*, 2002, vol. 14, No. 4, pp. 317-321.
Klimov, Victor, "Mechanisms for Photogeneration and Recombination of Multiexcitons in Semiconductor Nanocrystals: Implications for Lasing and Solar Energy Conversion," *Journal of Physical Chemistry B*, 2006, vol. 110, No. 34, 16827-16845.

Hu et al., "Linearly Polarized Emission From Colloidal Semiconductor Quantum Rods," *Science*, 2001, vol. 292, No. 5524, pp. 2060-2063.
Chen et al., "Polarization spectroscopy of single CdSe quantum rods," *Physical Review B*, 2001, vol. 64, No. 24, pp. 245304-1-245304-4.
Htoon et al., "Light amplification in semiconductor nanocrystals: Quantum rods versus quantum dots," *Applied Physics Letters*, 2003, vol. 82, No. 26, pp. 4776-4778.
Zhai et al.,"Morphology-Dependent Stimulated Emission and Field Emission of Ordered CdS Nanostructure Arrays," *Acs Nano*, 2009, vol. 3, No. 4, pp. 949-959.
Yong et al., "Tumor Targeting and Imaging in Live Animals with Functionalized Semiconductor Quantum Rods," *Acs Applied Materials & Interfaces*, 2009, vol. 1, No. 3, pp. 710-719.
Deka et al., "CdSe/CdS/ZnS Double Shell Nanorods with High Photoluminescence Efficiency and Their Exploitation As Biolabeling Probes," *Journal of the American Chemical Society*, 2009, vol. 131, No. 8, pp. 2948-2958.
Pisanello et al., "Dots in rods as polarized single photon sources," *Superlattices and Microstructures*, 2010, vol. 47, No. 1, pp. 165-169.
Shweky et al., "Seeded growth of InP and InAs quantum rods using indium acetate and myristic acid," *Materials Science & Engineering C- Biomimetic and Supramolecular Systems*, 2006, vol. 26, pp. 788-794.
Dorfs et al., "ZnSe Quantum Dots Within CdS Nanorods: A Seeded-Growth Type-II System," *Small*, 2008, vol. 4, No. 9, pp. 1319-1323.
Menagen et al., "Selective Gold Growth on CdSe Seeded CdS Nanorods," *Chemistry of Materials*, 2008, vol. 20, No. 22, pp. 6900-6902.
Talapin et al., "Seeded Growth of Highly Luminescent CdSe/CdS Nanoheterostructures with Rod and Tetrapod Morphologies," *Nano Letters*, 2007, vol. 7, No. 10, pp. 2951-2959.
Muller et al., "Wave Function Engineering in Elongated Semiconductor Nanocrystals with Heterogeneous Carrier Confinement," *Nano Letters*, 2005, vol. 5, No. 10, pp. 2044-2049.
Muller et al., "Monitoring surface charge migration in the spectral dynamics of single CdSe/CdS nanodot/nanorod heterostructures," *Physical Review B*, 2005, vol. 72, No. 20, pp. 205339-1-205339-12.
Carbone et al., "Synthesis and Micrometer-Scale Assembly of Colloidal CdSe/CdS Nanorods Prepared by a Seeded Growth Approach," *Nano Letters*, 2007, vol. 7, No. 10, pp. 2942-2950.
Sift et al., "Multiexciton Engineering in Seeded Core/Shell Nanorods: Transfer from Type-I to Quasi-type-II Regimes," *Nano Letters*, 2009, vol. 9, No. 10, pp. 3470-3476.
Talapin et al., "Highly Emissive Colloidal CdSc/CdS Heterostructures of Mixed Dimensionality," *Nano Letters*, 2003, vol. 3, No. 12, pp. 1677-1681.
Zavelani-Rossi et al., "Suppression of Biexciton Auger Recombination in CdSe/CdS Dot/Rods: Role of the Electronic Structure in the Carrier Dynamics," *Nano Letters*, 2010, vol. 10, No. 8, pp. 3142-3150.
Manna et al., "Expitaxial Growth and Photochemical Annealing of Graded CdS/ZnS Shells on Colloidal CdSe Nanorods," *Journal of the American Chemical Society*, 2002, vol. 124, No. 24, pp. 7136-7145.
Mokari et al., "Synthesis and Properties of CdSe/ZnS Core/Shell Nanorods," *Chemistry of Materials*, 2003, vol. 15, No. 20, pp. 3955-3960.
Guzelian et al., "Colloidal chemical synthesis and characterization of InAs nanocrystal quantum dots," *Applied Physics Letters*, 1996, vol. 69, No. 10, pp. 1432-1434.
Cao et al., "Growth and Properties of Semiconductor Core/Shell Nanocrystals with InAs Cores," *Journal of the American Chemical Society*, 2000, vol. 122, No. 40, pp. 9692-9702.
Manna et al., "Synthesis of Soluble and Processable Rod-, Arrow-, Teardrop-, and Tetrapod-Shaped CdSe Nanocrystals," *Journal of the American Chemical Society*, 2000, vol. 122, No. 51, pp. 12700-12706.

(56) References Cited

OTHER PUBLICATIONS

Zhong et al., "Shape Tuning of Type II CdTe—CdSe Colloidal Nanocrystal Heterostructures through Seeded Growth," *Journal of the American Chemical Society*, 2009, vol. 131, No. 26, pp. 9170-9171.

Puangmali et al., "Monotonic Evolution of the Optical Properties in the Transition from Three-to Quasi-Two-Dimensional Quantum Confinement in InAs Nanorods," *Journal of Physical Chemistry C*, 2010, vol. 114, No. 15, pp. 6901-6908.

Menagen et al., "Au Growth on Semiconductor Nanorods: Photoinduced versus Thermal Growth Mechanisms," *Journal of the American Chemical Society*, 2009, vol. 131, No. 47, pp. 17406-17411.

Li et al., "Electronic structure and optical properties of quantum rods with wurtzite structure," *Physical Review B*, 2002, vol. 66, No. 11, pp. 115316-1-115316-6.

Shabaev et al., "1D Exciton Spectroscopy of Semiconductor Nanorods," *Nano Letters*, 2004, vol. 4, No. 10 pp. 1821-1825.

Le Thomas et al., "Exciton Fine Structure in Single CdSe Nanorods," *Physical Review Letters*, 2005, vol. 94, No. 1, pp. 016803-1-016803-4.

Hu et al., "Semiempirical Pseudopotential Calculation of Electronic States of CdSe Quantum Rods," *Journal of Physical Chemistry B*, 2002, vol. 106, No. 10, pp. 2447-2452.

Wang et al., "Highly Polarized Photoluminescence and Photodetection from Single Indium Phosphide Nanowires," *Science*, 2001, vol. 293, No. 5534, pp. 1455-1457.

Zhao et al., "Optical Analysis of a series of Size and Shape-controlled Type-II CdTe/CdSe/CdTe Heterostructure Nanorods," *Journal of Physics: Conference Series*, 2010, vol. 245, pp. 1-4.

Manna et al., "Controlled growth of tetrapod-branched inorganic nanocrystals," *Nature Materials*, 2003, vol. 2, No. 6, pp. 382-385.

\* cited by examiner

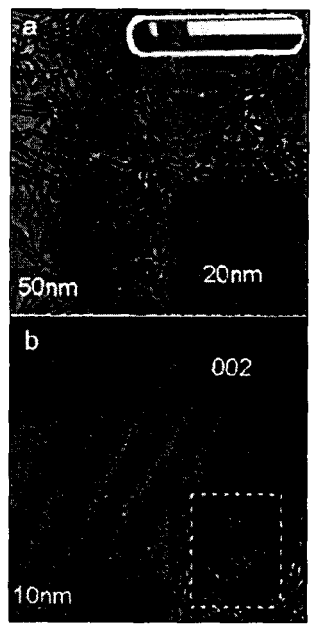
FIG.4A
FIG.4B
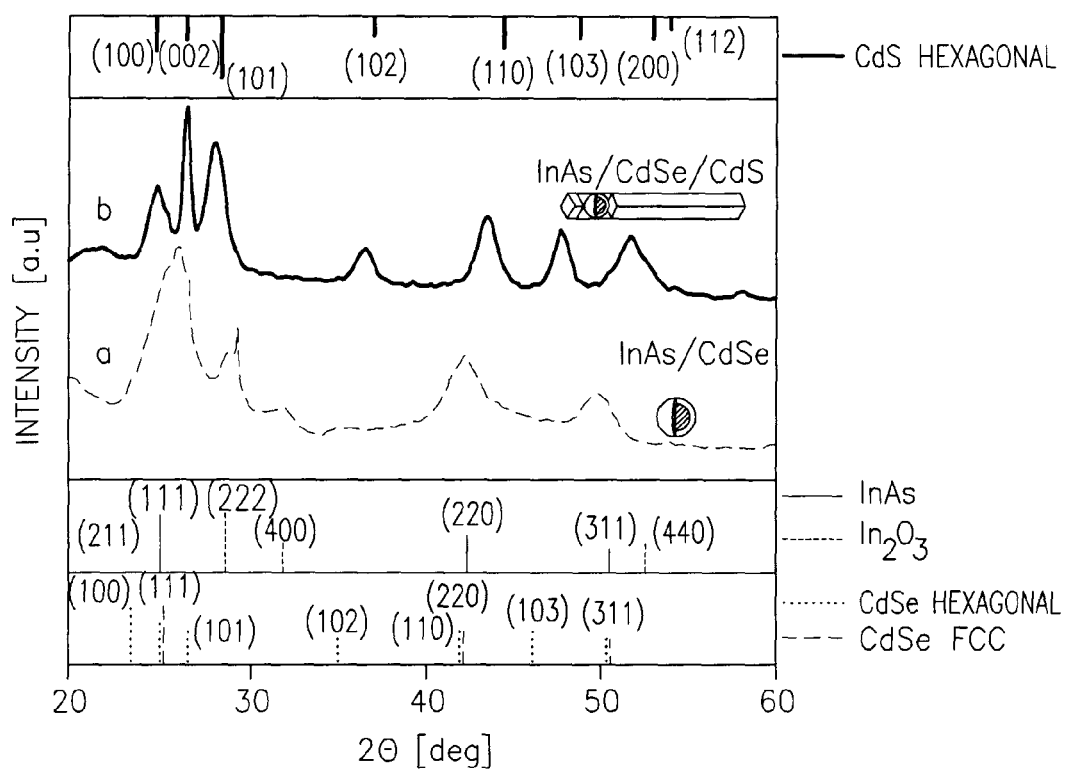
FIG.5

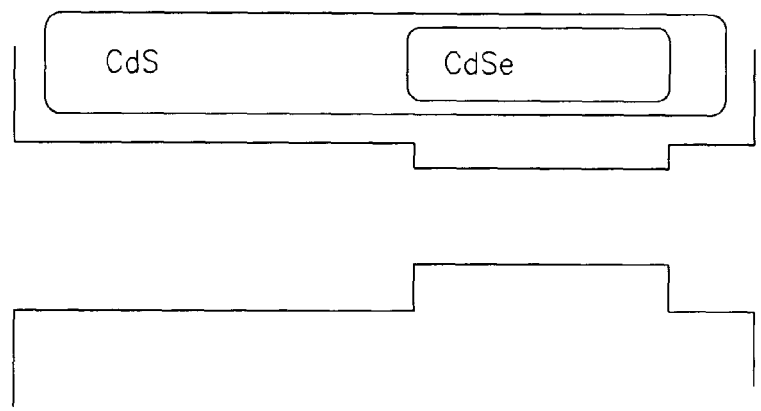
FIG.15
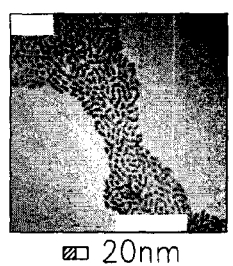 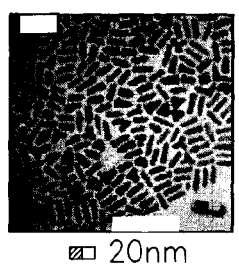 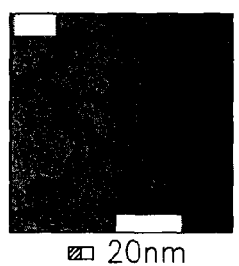 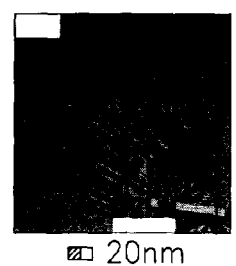
FIG.16A  FIG.16B  FIG.16C  FIG.16D
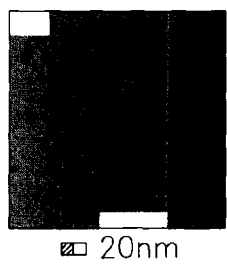 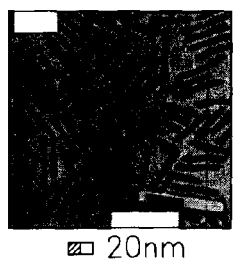 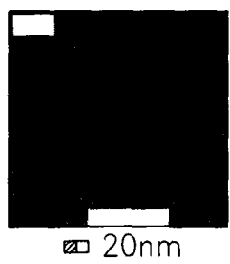 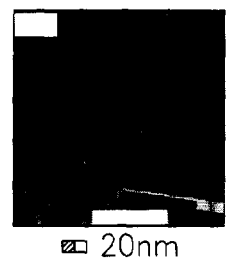
FIG.16E  FIG.16F  FIG.16G  FIG.16H

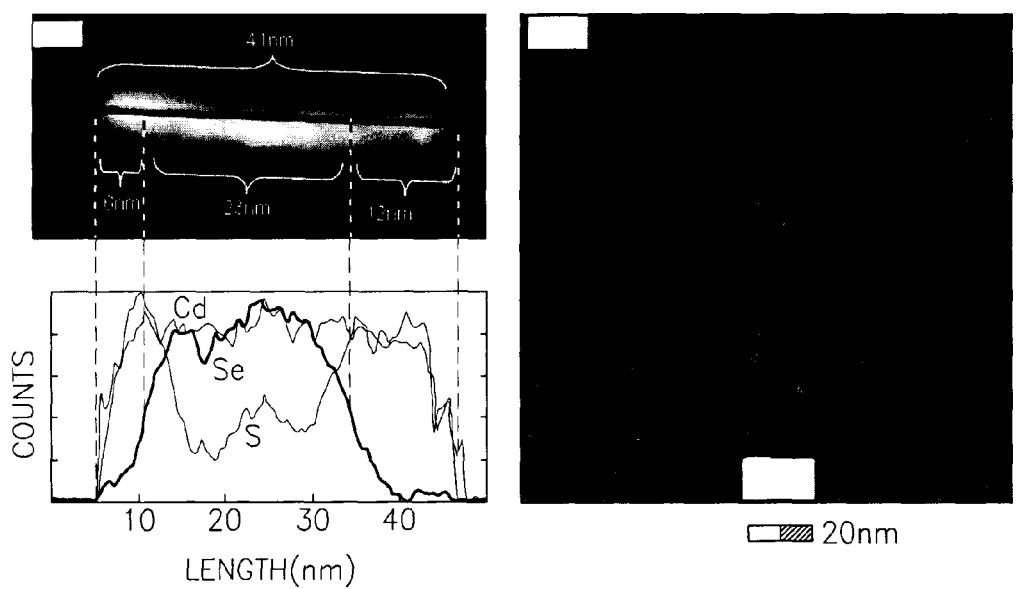
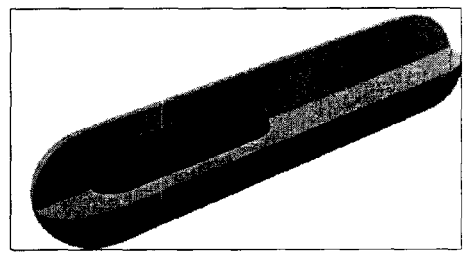 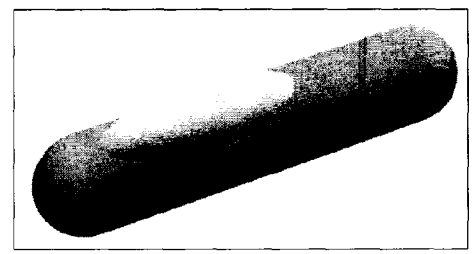
FIG.17A　　　　FIG.17B

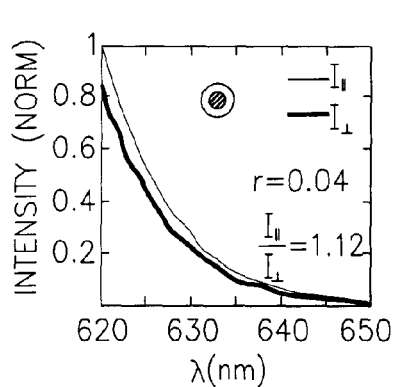 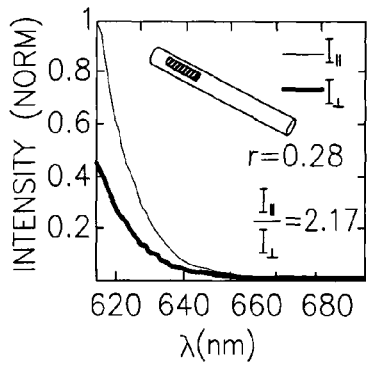 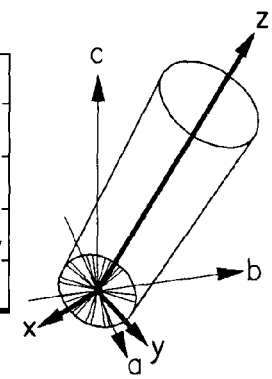
FIG.19A  FIG.19B  FIG.19C
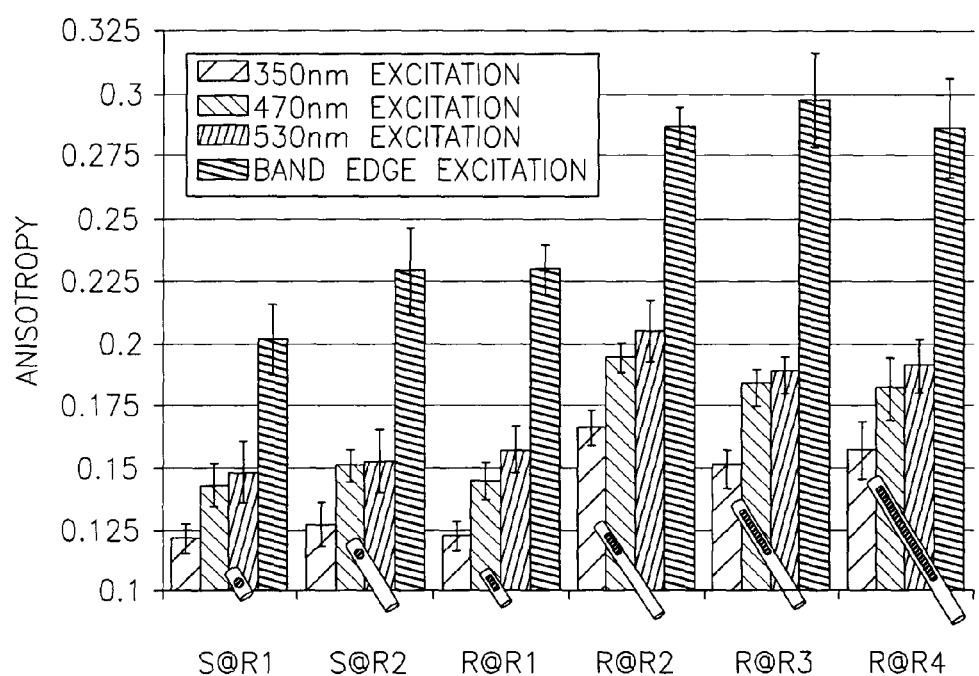
FIG.19D

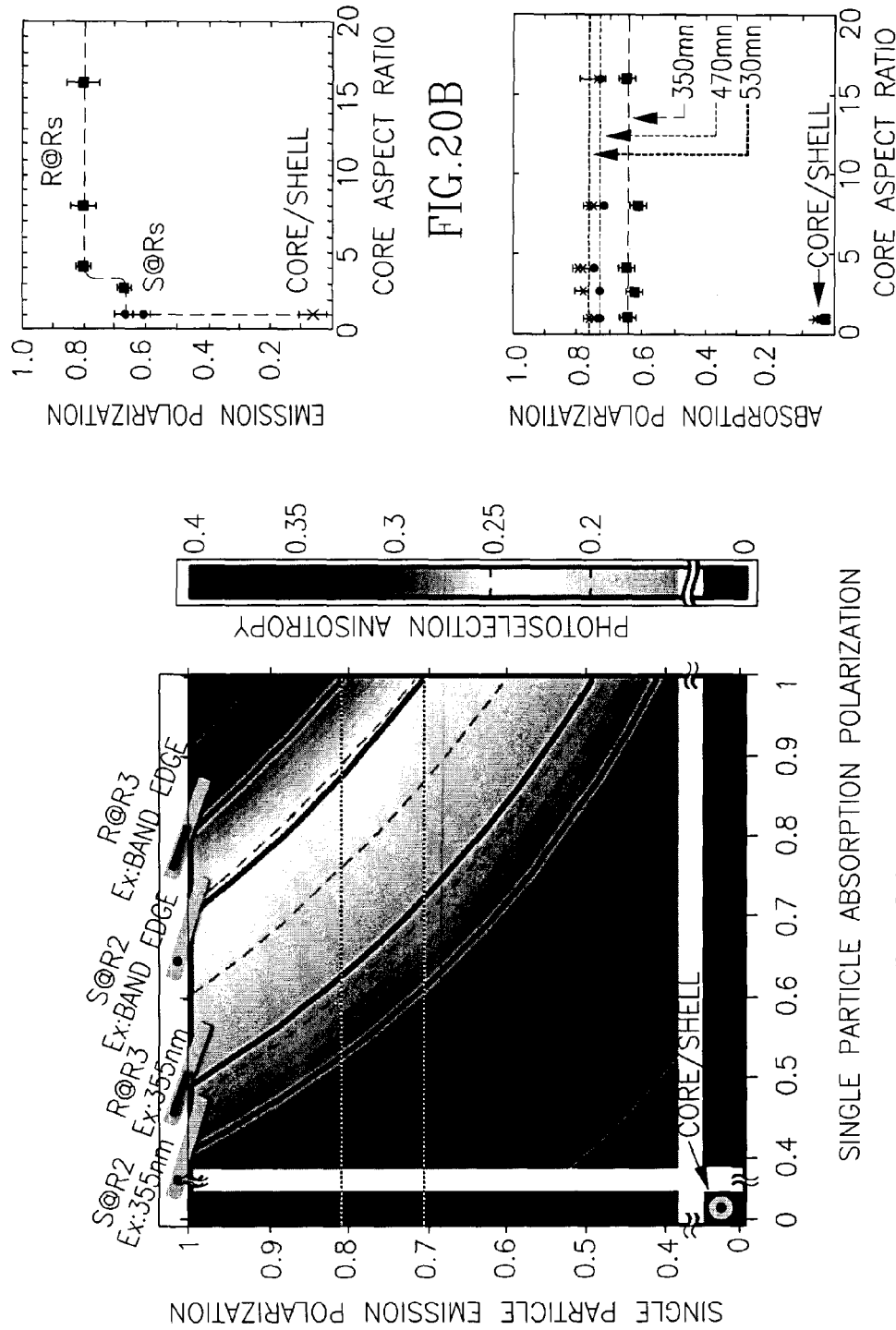

Scheme 1

Scheme 2

Scheme 3

ANISTROPIC SEMICONDUCTOR NANOPARTICLES

FIELD OF THE INVENTION

This invention generally relates to nanomaterials, particularly anisotropic semiconductor nanoparticles.

BACKGROUND OF THE INVENTION

Colloidal semiconductor nanocrystals (NCs) have attracted great interest due to the ability to tailor their absorption and photoluminescence (PL) over a wide spectral range, by changing their size, shape and composition. In particular, II-VI and III-V semiconductors NCs are of importance due to their fluorescence, covering the visible to the near infrared (NIR) spectrum, which is appealing for a variety technological applications [1,2].

The optical behavior of the particles can be further modified by controlling their shape. For example, unlike spherical NCs, nanorods have been found to have linearly polarized emission. In addition, the rod shape of the particles enables electric field induced switching of the fluorescence [3,4]. These properties make semiconductor nanorods (NRs) highly desirable [3,5,6].

Furthermore, NRs display unique characteristics including low lasing thresholds associated with increased Auger lifetimes [7,8], large absorbance cross-sections, and linearly polarized absorption and emission [9,10]. These properties show promise for using NRs in applications such as lasing [7,11,12], bio-labeling [13,14], and polarized single-photon sources [15].

While II-VI semiconductor nanorods are grown via a surfactant control growth approach, this approach is difficult to realize for cubic structured semiconductor NCs such as the III-V semiconductors. In these NCs, chemically dissimilar surfaces are not obviously present due to the high symmetry of lattice, and as a result preferential binding of ligands, which is essential for the surfactant controlled growth mechanism, cannot be obtained. Previous works showed that III-V semiconductor rods can be grown via a solution-liquid-solid (SLS) mechanism, by using small metal NCs as catalyst for rod growth [16,17]. However, the presence of the metal particles strongly quenches the photoluminescence.

Recently, a new type of core-shell nanoparticles, known as seeded rods (SRs) was introduced [18-20], where spherical nanoparticle of one material is embedded within a rod of another material. Several SR systems were reported including CdSe cores embedded in CdS rods, forming type-I and quasi-type-II systems [20-24], and ZnSe cores embedded in CdS rods forming a type-II system [18]. These particles exhibit several advantageous properties typical for 1d systems, including linearly polarized emission [23,25], suppression of Auger nonradiative recombination [26], and large absorbance cross-sections [18,20,23].

The synthesis of such structures is performed by two consecutive steps, where NCs seeds are first synthesized, and then the seeds are rapidly injected into a hot solution of precursors and ligands for the formation of a rod shell around them. Such dot-rod heterostructures are highly crystalline and uniform and exhibit strong and stable PL emission. However, in order to achieve good optical properties, the core and shell materials should have a low lattice-mismatch and generally also similar crystal type, which limits the variety of structures that can be constructed in this manner. Core/multishell NPs were introduced for spherical shaped particles, but the utilization of this concept in rod shaped systems and in particular in seeded rod was never previously performed.

Core\shell semiconductors nanoparticles are more stable for photoluminescence and have higher quantum efficiency due to the shell passivation of the dangling bonds. Bawendi et al. [27] presented synthesis of CdSe quantum dots coated with a ZnS shell and having photoluminescence quantum yield of up to 50% and a narrow size distribution. These CdSe dots were synthesized through a typical TOP\TOPO synthesis. A size selective precipitation of these dots was performed by means of centrifugation. A ZnS shell was deposited by a drop-wise addition of the Zn and S precursor mixture. It was further contemplated that the process may be applicable also for CdTe and CdS cores and for ZnSe shell. Banin et al. [16] discloses different III-V II-VI core shell combinations.

Treadway et al. [28] expanded the method for various kinds of semiconductors materials including II-VI III-V families. In this method all the layer precursors are added simultaneously as described therein. In 2003, Peng et al. [29] demonstrated a method for preparing core/shell structures. In the method the layers are added successively and each layer is added in two steps, one for the anion and second for the cation.

In 2005, Banin et al. [30], using a layer by layer method, showed a new kind of material, composited of a core coated with a multilayered shell. This work presented III-V\II-VI\II-VI spherical core\shell1\shell2 materials, having high quantum efficiency and high photostabilty improved over the previous core/shell. In addition, this method enables a variety of combinations between different materials and crystal structures. Peng et al. [29] described syntheses of II-VI\II-VI, III-V\II-VI, II-VI\III-V and III-VI\III-V spherical core\shell nanocrystals, creating quantum dots and quantum shells (reverse type-I). The same method is used for synthesizing of core\multishell structures, creating quantum wells and dual emitting quantum dots. Furthermore, core\shell and core\multishell nanocrystals doped with transition metals (Mn, Fe, Cu, etc.) are synthesized using the same method.

Rod-shaped semiconductors nanoparticles have unique properties due to their ID confinement. These materials hold high polarization which can be used in different applications.

Alivisatos et al. [31] describes a process for the formation of II-VI semiconductor nanorods, in which shape control is achieved by adding different surfactants. The balance between the surfactant induces different shapes. Group II metal (Zn, Cd, Hg) and group VI element (S, Se, Te) are added, together or separately, to the heated mixture of surfactants, followed by decreasing the temperature to allow crystal growth.

Alivisatos et al. [32] suggested the same process for the formation of III-V semiconductor nanorods.

Rod/shell materials have better optical properties. However, this presents a significant synthetic challenge, as the rod shape must be preserved even though it is not thermodynamically stable. Several examples for core/shell NRs were synthesized, showing improved quantum efficiencies of around 30% [33,34]. These materials were reported by Alivisatos et al. [35] describing methods for synthesizing CdSe rod shaped core coated with a graded CdS\ZnS shell, and by Banin et al [34] growing ZnS shells. The shell precursors are added drop-wise. In this case the resulting structure has a thin shell layer and coats the rod essentially with even thickness on all sides. The invention contemplates the same structure for rod shaped cores and conformal shells of different semiconductor groups (II-VI, III-V, IV).

REFERENCES

[1] Aharoni, A.; Mokari, T.; Popov, I.; Banin, U., Synthesis of InAs/CdSe/ZnSe core/shell1/shell2 structures with bright and stable near-infrared fluorescence. *Journal of the American Chemical Society* 2006, 128, (1), 257-264.

[2] Zimmer, J. P.; Kim, S. W.; Ohnishi, S.; Tanaka, E.; Frangioni, J. V.; Bawendi, M. G., Size series of small indium arsenide-zinc selenide core-shell nanocrystals and their application to in vivo imaging. *Journal of the American Chemical Society* 2006, 128, (8), 2526-2527.

[3] Fu, A.; Gu, W. W.; Boussert, B.; Gerion, D.; Larabell, C.; Alivisatos, A. P., Developing semiconductor nanorods as probes in biological imaging. *Abstracts of Papers of the American Chemical Society* 2005, 230, U1110-U1110.

[4] Rothenberg, E.; Kazes, M.; Shaviv, E.; Banin, U., Electric field induced switching of the fluorescence of single semiconductor quantum rods. *Nano Letters* 2005, 5, (8), 1581-1586.

[5] Allen, P. M.; Liu, W. H.; Chauhan, V. P.; Lee, J.; Ting, A. Y.; Fukumura, D.; Jain, R. K.; Bawendi, M. G., InAs(ZnCdS) Quantum Dots Optimized for Biological Imaging in the Near-Infrared. *Journal of the American Chemical Society* 2010, 132, (2), 470-+.

[6] Tessler, N.; Medvedev, V.; Kazes, M.; Kan, S. H.; Banin, U., Efficient near-infrared polymer nanocrystal light-emitting diodes. *Science* 2002, 295, (5559), 1506-1508.

[7] Kazes, M.; Lewis, D. Y.; Ebenstein, Y.; Mokari, T.; Banin, U. Advanced Materials 2002, 14, (4), 317-322.

[8] Klimov, V. I. Journal of Physical Chemistry B 2006, 110, (34), 16827-16845.

[9] Hu, J. T.; Li, L. S.; Yang, W. D.; Manna, L.; Wang, L. W.; Alivisatos, A. P., Linearly polarized emission from colloidal semiconductor quantum rods. Science 2001, 292, (5524), 2060-2063.

[10] Chen, X.; Nazzal, A.; Goorskey, D.; Xiao, M.; Peng, Z. A.; Peng, X. G. Physical Review B 2001, 64, (24), 245304.

[11] Htoon, H.; Hollingworth, J. A.; Malko, A. V.; Dickerson, R.; Klimov, V. 1. Applied Physics Letters 2003, 82, (26), 4776-4778.

[12] Zhai, T. Y.; Fang, X. S.; Bando, Y. S.; Liao, Q.; Xu, X. J.; Zeng, H. B.; Ma, Y.; Yao, J. N.; Golberg, D. Acs Nano 2009, 3, (4), 949-959.

[13] Yong, K. T.; Hu, R.; Roy, 1.; Ding, H.; Vathy, L. A.; Bergey, E. J.; Mizuma, M.; Maitra, A.; Prasad, P. N. Acs Applied Materials & Interfaces 2009, 1, (3), 710-719.

[14] Deka, S.; Quarta, A.; Lupo, M. G.; Falqui, A.; Boninelli, S.; Giannini, C.; Morello, G.; De Giorgi, M.; Lanzani, G.; Spinella, C.; Cingolani, R.; Pellegrino, T.; Manna, L. Journal of the American Chemical Society 2009, 131, (8), 2948-2958.

[15] Pisanello, F.; Martiradonna, L.; Spinicelli, P.; Fiore, A.; Hermier, J. P.; Manna, L.; Cingolani, R.; Giacobino, E.; De Vittorio, M.; Bramati, A. Superlattices and Microstructures 2010, 47, (1), 165-169.

[16] U.S. Pat. No. 6,788,453.

[17] Shweky, 1.; Aharoni, A.; Mokari, T.; Rothenberg, E.; Nadler, M.; Podov, 1.; Banin, U., Seeded growth of InP and InAs quantum rods using indium acetate and myristic acid. Materials Science & Engineering C-Biomimetic and Supramolecular Systems 2006, 26, (5-7), 788-794.

[18] Dorfs, D.; Salant, A.; Popov, I.; Banin, U., ZnSe quantum dots within CdS nanorods: A seeded-growth type-II system. Small 2008, 4, (9), 1319-1323.

[19] Menagen, G.; Mocatta, D.; Salant, A.; Popov, I.; Dorfs, D.; Banin, U., Selective Gold Growth on CdSe Seeded CdS Nanorods. Chemistry of Materials 2008, 20, (22), 6900-6902.

[20] Talapin, D. V.; Nelson, J. H.; Shevchenko, E. V.; Aloni, S.; Sadtler, B.; Alivisatos, A. P., Seeded growth of highly luminescent CdSe/CdS nanoheterostructures with rod and tetrapod morphologies. Nano Letters 2007, 7, (10), 2951-2959.

[21] Muller, J.; Lupton, J. M.; Lagoudakis, P. G.; Schindler, F.; Koeppe, R.; Rogach, A. L.; Feldmann, J.; Talapin, D. V.; Weller, H. Nano Letters 2005, 5, (10), 2044-2049.

[22] Muller, J.; Lupton, J. M.; Rogach, A. L.; Feldmann, J.; Talapin, D. V.; Weller, H. Physical Review B 2005, 72, (20), 205339.

[23] Carbone, L.; Nobile, C.; De Giorg, M.; Sala, F. D.; Morello, G.; Pompa, P.; Hytch, M.; Snoeck, E.; Fiore, A.; Franchini, I. R.; Nadasan, M.; Silvestre, A. F.; Chiodo, L.; Kudera, S.; Cingolani, R.; Krahne, R.; Manna, L. Nano Letters 2007, 7, (10), 2942-2950.

[24] Sitt, A.; Della Sala, F.; Menagen, G.; Banin, U. Nano Letters 2009, 9, (10), 3470-3476.

[25] Talapin, D. V.; Koeppe, R.; Gotzinger, S.; Kornowski, A.; Lupton, J. M.; Rogach, A. L.; Benson, O.; Feldmann, J.; Weller, H. Nano Letters 2003, 3, (12), 1677-1681.

[26] Zavelani-Rossi, M.; Lupo, M. G.; Tassone, F.; Manna, L.; Lanzani, G. Nano Letters 2010, 10, (8), 3142-3150.

[27] U.S. Pat. No. 7,125,605.

[28] U.S. Pat. No. 7,172,791.

[29] US Patent Application No. 2005/0129947.

[30] US Patent Application No. 2009/0230382.

[31] U.S. Pat. No. 6,225,198.

[32] U.S. Pat. No. 6,306,736.

[33] Manna, L.; Scher, E. C.; Li, L. S.; Alivisatos, A. P. Journal of the American Chemical Society 2002, 124, (24), 7136-7145.

[34] Mokari, T.; Banin, U. Chemistry of Materials 2003, 15, (20), 3955-3960.

[35] US Patent Application No. 2005/0054004.

[36] Guzelian, A. A.; Banin, U.; Kadavanich, A. V.; Peng, X.; Alivisatos, A. P., Colloidal chemical synthesis and characterization of InAs nanocrystal quantum dots. Applied Physics Letters 1996, 69, (10), 1432-1434.

[37] Cao, Y. W.; Banin, U., Growth and properties of semiconductor core/shell nanocrystals with InAs cores. Journal of the American Chemical Society 2000, 122, (40), 9692-9702.

[38] Manna, L.; Milliron, D. J.; Meisel, A.; Scher, E. C.; Alivisatos, A. P., Controlled growth of tetrapod-branched inorganic nanocrystals. Nature Materials 2003, 2, (6), 382-385.

[39] Manna, L.; Scher, E. C.; Alivisatos, A. P., Synthesis of soluble and processable rod-, arrow-, teardrop-, and tetrapod-shaped CdSe nanocrystals. Journal of the American Chemical Society 2000, 122, (51), 12700-12706.

[40] Zhong, H. Z.; Scholes, G. D., Shape Tuning of Type II CdTe—CdSe Colloidal Nanocrystal Heterostructures through Seeded Growth. Journal of the American Chemical Society 2009, 131, (26), 9170-+.

[41] Puangmali, T.; Califano, M.; Harrison, P., Monotonic Evolution of the Optical Properties in the Transition from Three- to Quasi-Two-Dimensional Quantum Confinement in InAs Nanorods. Journal of Physical Chemistry C 2010, 114, (15), 6901-6908.

[42] Menagen, G.; Macdonald, J. E.; Shemesh, Y.; Popov, I.; Banin, U. Journal of the American Chemical Society 2009, 131, (47), 17406-17411.

[43] Li, X. Z.; Xia, J. B. Physical Review B 2002, 66, (11), 115316.

[44] Shabaev, A.; Efros, A. L. Nano Letters 2004, 4, (10), 1821-1825.

[45] Le Thomas, N.; Herz, E.; Schops, O.; Woggon, U.; Artemyev, M. V. Physical Review Letters 2005, 94, (1), 016803.

[46] Lakowicz, J. R., Principles of Fluorescence Spectroscopy. Third Edition ed.; Springer. Singapore, 2006.

[47] Kliger, D. S.; Lewis, J. W.; Einterz, R. C., Polarized Light in Optics and Spectroscopy. First ed.; Academic Press Inc.: San Diego, 1990.

[48] Hu, J. T.; Wang, L. W.; Li, L. S.; Yang, W. D.; Alivisatos, A. P. Journal of Physical Chemistry B 2002, 106, (10), 2447-2452.

[49] Wang, J. F.; Gudiksen, M. S.; Duan, X. F.; Cui, Y.; Lieber, C. M. Science 2001, 293, (5534), 1455-1457.

[50] U.S. Pat. No. 6,225,198.

[51] U.S. Pat. No. 7,303,628.

[52] US Patent Application No. 2010/0090164.

SUMMARY OF THE INVENTION

Rod-shaped nanocrystals are of great interest because the rod shape produces polarized light emission. A drawback of rod-shaped structures such as nanorods (NRs), in comparison to spherical nanocrystals, is their lower fluorescence quantum efficiencies. This originates, on the one hand, from the increased delocalization of the carriers in the NRs which reduces the electron-hole overlap, decreasing the radiative decay rate, and, on the other hand, from the large surface area of the NRs that increases the probability for surface trapping, leading to higher non-radiative decay rate.

The present invention provides a novel family of Seeded Rod (SR) nanostructures (referred also herein as "SR systems"), in which such deficiencies, known for the spherical nanocrystals as well as for nanorod systems, are minimized or completely diminished. The SR systems of the invention, as will be further demonstrated hereinbelow, exhibit the following characteristics:

1. Seeded rod with seeds that have a core/multi-shell structure have higher quantum efficiency because of improved compatibility of interfaces and better surface electronic passivation.

2. Buffer layers between the seed inner core and the outer rod structure enable deposition of materials of different lattice constants by relaxing stress and strain between the different layers and, therefore, enable a better shell growth with improved optical characteristics.

3. The formation of the rod-shell imparts a rod-like behaviour on electronic states originating from the spherical seed, including polarization of the absorption and the emission, and increased Auger lifetime.

4. Buffer layers between the inner core and outer rod enable deposition of materials of different crystal structures with different reactive facets, through which selective growth in particular directions can be obtained. For example, the growth of layer with hexagonal crystal structure on top of a core with cubic crystal structure enables the growth of a third rod shaped shell, otherwise difficult to synthesize in cubic systems.

5. Spatial electron and hole distributions along the particle can be controlled through applied electronic and electromagnetic fields, leading to controlled changes in the emission behaviour.

Thus, the invention provides in one of its aspects a seeded rod (SR) nanostructure comprising an elongated structure (rod-like structure) embedded (seeded) with a single seed structure, said seed structure being a core/shell structure or a single-material rod element (not a core/shell structure, the material of the rod element being different from the material of the elongated structure);

where said seed structure is a rod element, the thickness of the elongated structure material embedding said rod element, along one axis of the nanostructure (as further explained hereinbelow) is greater on one end as compared to the other end along the same axis, or the thickness along one axis is greater as compared to the thickness along another axis; and where the seed is a core/shell structure, the material of at least one of said core and shell is a semiconductor material.

The SR system of the invention is generally depicted in FIG. 21. In FIG. 21, the SR system is designated (100), the elongated structure is designated (10) and the single seed structure embedded within said elongated structure is generally designated (20).

In some embodiments, the seed structure (20) is a core/shell structure such as (21), (22), (23), (24), and (26). In other embodiments, the seed structure (20) is a single material rod element, depicted by element (25).

As used herein, the term "seeded rod", SR, or any lingual variation thereof, refers to a nano-size elongated heterostructure (100), being typically between about 5 nm and 500 nm in length and between about 2 and 50 nm in width (thickness). The SR nanostructure may have an aspect ratio (length/thickness) between 1.8 and 20. In some embodiments, the aspect ratio is larger than 1.8. In further embodiments, the aspect ratio is larger than 2. In still further embodiments, the aspect ratio is larger than 3 and in further embodiments, the aspect ratio is larger than 10.

In the SR the chemical composition may change with position.

The SR (100) of the invention is made of a "seed structure" (20), which is embedded (seeded or contained or enclosed) within an "elongated structure" (10). The seed structure (20) and the elongated structure (10) which contains the seed are of different materials/compositions and may be of different structures and forms. The outermost (as defined herein) material of the seed structure (20) is in direct contact with the material of the elongated structure (10).

The elongated structure is a non-spherical shaped structure which may be of any elongated shape, such as a rod, rice, cylindrical, arrow, an elongated rectangle, or a branched system with two arms (bipod), three arms (tripod) four arms (tetrapod) and so on. The seed structure embedded within the elongated structure may be a core/shell system, referred to herein as a "core/shell SR system" or may be a non-core/shell rod element, referred to herein as a "rod-in-rod SR system".

In some embodiments, the SR system of the invention is a core/shell SR system, in which case the core/shell seed may be spherical or non-spherical in shape and may be positioned concentrically or non-concentrically within the elongated structure in which it is embedded. Where the core/shell or any of the shells of the core/shell structure are non-spherical, they may be of a form selected from rod-like shape, rod, rice, cylindrical, arrow, an elongated rectangle, or a branched system with two arms (bipod), three arms (tripod) four arms (tetrapod) and so on.

As used herein, the term "spherical", or any lingual variation thereof, refers generally to a substantially (nearly) round-ball geometry. The term generally reflects on the spherical non-elongated shape of a nanoparticle (core seed, shell, etc), which need not be perfectly round in shape. The size of the spherical nanoparticle is typically the average diameter thereof. A "non-spherical" nanoparticle is such which is "elongated" in shape and has a defined long and short axis. The size of the elongated nanoparticle (such as the SR systems of the invention, a rod-element in rod-in-rod SR systems according to the invention, or elongated shell structures), is given as the length of the long axis of the particle, the width (short axis) and/or the particle aspect ratio.

As stated herein, the core/shell structure or the rod-element structure may be positioned concentrically or non-concentrically within the elongated structure of the SR system. An element or structure is said of being "concentrically" positioned with respect of a further element or structure when the geometrical center of each of the elements of structures are substantially coaxially aligned. When the centers are not so aligned, the elements or structures are regarded as being non-concentric with respect of each other, namely their geometrical centers do not coaxially align.

In some embodiments, the overall shape of the core/shell structure is spherical and constitutes a core and one or more shells, each shell may have a thickness of at least about 0.2 nm. In other embodiments, the thickness of each of said shells is at least about 1 nm. In further embodiments, the thickness is at most 20 nm.

In some embodiments, the thickness ranges from about 0.2 nm to about 20 nanometers. In some embodiments, the thickness may range from about 0.2 nm to about 4 nm. In other embodiments, the thickness may range from about 0.2 nm to about 8 nm. In further embodiments, the thickness may range from about 0.2 nm to about 12 nm. In other embodiments, the thickness may range from about 0.2 nm to about 16 nm. In some embodiments, the thickness may range from about 1 nm to about 4 nm. In other embodiments, the thickness may range from about 1 nm to about 8 nm. In further embodiments, the thickness may range from about 1 nm to about 12 nm. In some embodiments, the thickness may range from about 1 nm to about 16 nm. In additional embodiments, the thickness may range from about 1 nm to about 20 nm. In some embodiments, the thickness may range from about 2 nm to about 4 nm. In other embodiments, the thickness may range from about 2 nm to about 8 nm. In further embodiments, the thickness may range from about 2 nm to about 16 nm. In some additional embodiments, the thickness may range from about 2 nm to about 20 nm.

In other embodiments, the overall shape of the core/shell structure is non-spherical but rather elongated. In such cases, the length of the longest axis of the structure is between 6 to 100 nm, and the thickness (width) may range from 1.5 to 10 nm.

In other embodiments, the elongated shaped core/shell structure may have an aspect ratio (length/diameter) between 1.8 and 50. In some embodiments, the aspect ratio is larger than 1.8. In further embodiments, the aspect ratio is larger than 2. In still further embodiments, the aspect ratio is larger than 3 and in further embodiments, the aspect ratio is larger than 10.

The SR system of the invention is a rod-like nanostructure (100), the nanostructure comprising an elongated structure (10) of a first material (which in some embodiments, is a semiconductor material), embedding a seed structure (20) which may be core/shell structure (such as, (21), (22), (23), (24), and (26)) comprising a core of a second (e.g., semiconductor) material and at least one shell of a further (e.g., semiconductor) material, each of said first, second and further (e.g., semiconductor) materials being selected such that adjacent materials are different from each other.

Thus, the core/shell structure has a core of one material and at least one shell of a different material, one or more of said materials is a semiconductor material. Where the core/shell structure comprises of more than one shell, the structure may then be referred to as a "core/multishell" structure, and may then be designated as core/shell(1)/shell(2) . . . /shell(n) wherein (n) is the number of consecutive shells from 1 to 30. Thus, the number of shells (n) is selected from 1, 2, 3, 4, 5, 6, 7, 8, 9, 10, 11, 12, 13, 14, 15, 16, 17, 18, 19, 20, 21, 22, 23, 24, 25, 26, 27, 28, 29 and 30. The number of shells, depending inter alia on the SR system of the invention and the intended application, is 1, or 2, or 3, or 4, or 5, or 6, or 7, or 8, or 9, or 10, or 11, or 12, or 13, or 14, or 15, or 16, or 17, or 18, or 19, or 20, or 21, or 22, or 23, or 24, or 25, or 26, or 27, or 28, or 29 or 30.

In some embodiments, the number of shells ranges from 1 and 5. In further embodiments, the number of shells ranges from 2 and 5. In some embodiments, the number of shells ranges from 2 and 4. In other embodiments, the number of shells is 2 or 3. In further embodiments, the number of shells is between 5 and 30.

Adjacent shells are of different materials/compositions. In a core/multishell structure, at least one of the core and shell(1), shell(2) . . . shell(n) materials is a semiconductor material. In some embodiments, in a core/multishell structure, the material of each of core and shell(1), shell(2) . . . shell(n) is a semiconductor material.

Each shell may be spherical or non-spherical in shape, depending, inter alia, on the shape of the core or any of the inner shells. Where one or more of the shells is non-spherical, the subsequent shell(s) (namely the adjacent shell(s) which is/are further removed from the core) to the non-spherical shell are also non-spherical. Where one or more of the shells is spherical, the subsequent shell(s) (namely the adjacent shell(s) which is/are further removed from the core) may be either spherical or non-spherical in shape.

As the at least one shell may be spherical or elongated in shape, the core/shell structure may thus be selected from spherical core/spherical shell, spherical core/elongated shell, and elongated core/elongated shell.

In some embodiments, the core is spherical and each of the at least one shells is spherical. In other embodiments, the core is spherical and each of the at least one shells is elongated. In still other embodiments, the core is elongated in shape and each of the at least one shells is elongated.

The invention thus provides SR systems wherein the seed is a core/shell structure that is selected from:
  spherical core/spherical shell (e.g., 21, FIG. 21)
  spherical core/spherical shell(1)/spherical shell(2) (e.g., 22, FIG. 21)
  spherical core/elongated shell (e.g., 23, FIG. 21)
  spherical core/spherical shell(1)/elongated shell(2) (e.g., 24, FIG. 21)
  spherical core/elongated shell(1)/elongated shell(2)
  elongated core/elongated shell (e.g., 26, FIG. 21)
  elongated core/elongated shell(1)/elongated shell(2).

In some embodiments, the elongated structure (10) and the core/shell structure (20) embedded therein are concentric. Non-limiting examples of such concentric systems are presented in FIGS. 1B, 1D, 1H, 1L, and 1O.

In some embodiments, the elongated structure (10) and the core/shell structure (one or both of core and shell) embedded therein are non-concentric. Non-limiting examples of such non-concentric systems are presented in FIGS. 1A, 1C, 1E, 1F, 1G, 1I, 1J, 1K, 1P, 1Q and 1R.

The "core" is the innermost material contained in a core/shell structure. The core may be of various shapes, i.e., spherical (nearly spherical), rod, pseudo-pyramid, cube, octahedron and others. The core may be positioned concentrically or non-concentrically with respect of each or some of the shell(s), and/or with respect of the elongated structure in which the core/shell seed is embedded. In some embodiments, the core is spherical and may have a diameter ranging from about 1 to about 20 nm.

In further embodiments, the core is a rod-like particle, namely a nanocrystal with extended growth along one of its axis, while maintaining very small dimensions of the other two axes. The length of the longest axis of the rod-like core typically ranges from about 5 nm to about 400 nm. In some embodiments, the length of the longest axis is between 10 to 100 nm. In other embodiments, the thickness (width) of the rod-like core may range from about 2 to about 50 nm. In additional embodiments, the thickness is between about 2 and about 10 nm.

In other embodiments, the rod-like core may have an aspect ratio (length/diameter) between 1.8 and 20. In some embodiments, the aspect ratio is larger than 1.8. In further embodiments, the aspect ratio is larger than 2. In still further embodiments, the aspect ratio is larger than 3 and in further embodiments, the aspect ratio is larger than 10.

The material of the outermost shell of the core/shell structure, namely the shell which is in direct contact with the material of the elongated structure (in which it is embedded) is selected, in some of the embodiments disclosed herein, to have a lattice constant substantially similar to the lattice constant of any of the materials in contact therewith. Optionally further, the outermost shell is selected to have a polymorphic crystal form to enable e.g., facile anisotropic growth thereonto.

In fact, any of the shells' materials are selected to have a lattice constant substantially similar to the two material zones (shells or core and shells) which are adjacent form either of its sides (inside or outside) thereto so as to decrease the lattice strain between the material of, e.g., one shell and the material of an adjacent shell. Such a selection of core, shell and elongated structure materials significantly improves fluorescence quantum yield in comparison to standard SR structures lacking core/shell structures. This permits facile growth of various semiconductor combinations with anisotropic seeded-rod architecture and new combinations between different crystal structures, providing a better control over the anisotropic growth of the nanorod as well as the electronic potential profile and yielding improved optical characteristics.

As such, depending on the intended use, each shell material, being intermediate to two other materials, is in fact a buffer material which is selected to decrease the lattice strain between the materials. For example, in a SR system having a spherical core/spherical shell structure, the lattice constant of the material of the spherical shell (being the outermost shell of the core/shell structure) is intermediate to the lattice constant of the spherical core material and the material of the elongated structure in which the core/shell is embedded. Where the SR system comprises a spherical core/spherical shell(1)/spherical shell(2) structure, the lattice constant of the shell(1) material is intermediate to the lattice constant of the spherical core material and the material of shell(2). Also, the lattice constant of the shell(2) material is intermediate to the lattice constant of the shell(1) material and the material of elongated structure in which the core/shell is embedded.

Similarly, where the SR system comprises a spherical core/elongated shell structure, the lattice constant of the elongated shell material is intermediate to the lattice constant of the spherical core material and the material of the elongated structure.

For example, in cases where the core material is InAs, and shell(2) is CdS, shell(1) may be of CdSe. Where the core material is InP and shell(2) is ZnS, the shell(1) material may be ZnSe.

As stated above, the material of a core and/or a shell of a core/shell structure may be selected to have a polymorphic morphology so as to enable, e.g., facile elongated growth onto the seed (being the core or core/shell structure onto which elongated growth is directed). In some embodiments, the material enabling elongated growth, i.e., the material onto which direct elongated growth is to proceed, is selected amongst materials having both a cubic (zinc blend) and a non-cubic morphologies, wherein the non-cubic morphology is selected from hexagonal (wurtzite), monoclinic, orthorhombic, rhombohedral, and tetragonal crystal structure. For example, where the SR system comprises a spherical core/spherical shell(1)/elongated shell(2) structure, the material of spherical shell(1) may be selected to adopt an elongated morphology. Where the SR system comprises a spherical core/elongated shell(1)/elongated shell(2) structure, the core material may be selected to adopt an elongated morphology.

In other embodiments, the material of a core and/or a shell of a core/shell structure may be selected to have a crystal morphology compatible with facile elongated growth onto the seed (being the core or core/shell structure onto which elongated growth is directed), the crystal form may be selected from hexagonal (wurtzite), monoclinic, orthorhombic, rhombohedral, and tetragonal.

In another aspect of the invention, the SR system is a rod-in-rod system, wherein the elongated structure (10, FIG. 21) is seeded with a non-core/shell structure rod element (25) of a different material. The rod element endows the rod-in-rod SR system with significantly improved properties in terms of increased polarized emission and Auger recombination processes. The inner elongated element offers polarized emission such that the degree of emission polarization of the rod-in-rod structure is significantly higher as compared to that of a seeded rod with a spherical seed. The outer elongated shell also increases the absorption polarization at wavelengths related to its absorption. The outer elongated shell effectively passivates the surface of the embedded rod element, eliminating trap states at the interface, and thus leads to high emission quantum efficiencies and to improved photostability. Unlike rod/shell structures, wherein the shell acts as a thin coating over the rod element, the rod-in-rod SR system of the invention is of excellent optical properties, demonstrating strong and stable emission. As will be further demonstrated hereinbelow, the rod-in-rod SR systems of the invention are also prepared via a facile and fast approach that enables up-scaling.

Thus, the invention provides a seeded rod (rod-in-rod SR) system comprising an elongated structure (rod-like structure, 10) seeded with a rod element (25) of a single material (the material of the rod element being different from the material of the elongated structure). As used herein, the term "single material" refers to a rod element having a single chemical composition. As may be understood, the rod element is neither a core/shell structure nor a segmented (barcode) structure of two or more materials or compositions.

In some embodiments, the elongated structure (10) of the rod-in-rod SR system consists of a rod element of a single material (25), wherein said rod element may be positioned concentrically or non-concentrically with respect to the elongated structure (10). In some embodiments, the elongated structure of the rod-in-rod SR system consists of a rod element, which is positioned non-concentrically with respect to the elongated structure. In other words, the thickness of the elongated structure material along one of the axis, e.g., the long axis, of the SR system is greater on one end as compared to the other end along the same axis. This is clearly demonstrated in FIG. 22. In such embodiments, where the rod element is positioned non-concentrically, the thickness of the elongated structure material along one of the axis, e.g., the long axis (LX), as annotated $tk_1$ or $tk_2$, is greater than the thickness $tk_2$ or $tk_1$, respectively, along the same axis (the thickness being one or more of $tk_1 > tk_2$, $tk_1 < tk_2$, $tk_3 < tk_4$, $tk_3 > tk_4$).

In other embodiments, the elongated structure (10) of the rod-in-rod SR system consists of a rod element (25), wherein said rod element is positioned concentrically with respect to the elongated structure (10), with the thickness of the elongated structure material along one of the axis, e.g., the long axis (LX in FIG. 22), in comparison to the other axis, e.g., the short axis (SX in FIG. 22), is substantially different. In other words, the thickness $tk_1$ is substantially the same as $tk_2$, and the material thickness $tk_3$ is substantially the same as $tk_4$, wherein $tk_1$ (or $tk_2$) is different from $tk_3$ (or $tk_4$).

In some embodiments, the material thickness, $tk_1$ or $tk_2$, along the long axis is greater than the material thickness, $tk_3$ or $tk_4$, along the short axis.

In some embodiments, the thickness along the long axis (i.e., $tk_1$ and/or $tk_2$) of the rod-in-rod SR system is at least twice as large as the thickness along the short axis (i.e., $tk_3$ and/or $tk_4$). In other embodiments, the thickness along the long axis is at least three times as large as the thickness of the short axis.

As stated above, the invention provides a SR system comprising an elongated structure (10) embedded with a seed structure (20) being an elongated core/shell seed (such as element 26 in FIG. 21).

In some embodiments, the elongated core/shell structure comprises an elongated core and a number of elongated shells ranging from 1 to 30. The thickness of each of said shells, i.e., in an elongated core/multishell system, is as defined above for a spherical core/multishell system.

In some embodiments, the number of elongated shells is selected from 1, 2, 3, 4, 5, 6, 7, 8, 9, 10, 11, 12, 13, 14, 15, 16, 17, 18, 19, 20, 21, 22, 23, 24, 25, 26, 27, 28, 29 and 30. The number of shells, depending inter alia on the SR system of the invention and its intended application, is 1, or 2, or 3, or 4, or 5, or 6, or 7, or 8, or 9, or 10, or 11, or 12, or 13, or 14, or 15, or 16, or 17, or 18, or 19, or 20, or 21, or 22, or 23, or 24, or 25, or 26, or 27, or 28, or 29 or 30.

In some embodiments, the number of shells ranges from 1 and 5. In further embodiments, the number of shells ranges from 2 and 5. In further embodiments, the number of shells ranges from 2 and 4. In other embodiments, the number of shells is 2 or 3. In further embodiments, the number of shells is between 5 and 30.

In some embodiments, the number of the elongated shells is one. In other embodiments, the number of said elongated shells is 2 or 3.

The invention thus provides SR systems wherein the core/shell structure is selected from:
  elongated core/elongated shell (e.g., 26, FIG. 21)
  elongated core/elongated shell(1)/elongated shell(2).

In some embodiments, the elongated structure (10) and the elongated core/shell structure (20) embedded therein are concentric. Non-limiting examples of such concentric systems are presented in FIG. 1O.

In some embodiments, the elongated structure (10) and the elongated core/shell structure (20) embedded therein are non-concentric. Non-limiting examples of such non-concentric systems are presented in FIGS. 1P, 1R and 1Q.

As used herein with reference to any of the SR systems of the invention, or any component (shell, core, element) thereof, the term "material" refers to a single material or a combination of at least one material(s). The material may be a metal, a metal oxide, a metal alloy, an insulator, a semiconductor material or any combination thereof. In some embodiments, the term material refers to a semiconductor material; in such cases, the nanostructure of the invention is wholly of a semiconductor material, namely each of said core, shells and elongated structure materials, independently, is selected amongst semiconductor materials, as disclosed herein.

The material of one component of a SR system according to the invention may be different from the material of another component, or may be of the same material but of a different chemical composition. For example, the material of one shell may be a metal while the material of another shell may be a different metal or a semiconductor material. Similarly, the material of the core of a core/shell SR system may be a metal and the material of shell(1) may be a metal alloy or metal oxide of the metal from which the core is composed of.

The materials may be selected on the basis of their structural and electronic properties. In some cases, a material-gradient may be constructed whereby the material composition of, e.g., an inner shell as compared to, e.g., an outer shell, changes such that the concentration of one material within said chemical composition is continuously reduced while the concentration of another material increases. For example, a core material may be CdSe, a shell(n) material may be CdS, and the materials of any of the shells positioned therebetween is a graded alloy of the formula $CdSe_xS_{1-x}$, wherein x varies from slightly below 1 to slightly above zero (e.g., $0.9999 > x > 0.0001$).

As stated above, in a SR system of the invention, where the seed structure is a core/shell or core/multishell structure, at least one of the second (core) material and a further (shell) material is a semiconductor material. In fact, each of the SR materials, e.g., the first material (of the elongated structure), the second (core) material, and the further material(s) (of each of the at least one shells), of any of the SR systems of the invention (core/shell SR system or rod-in-rod SR system), independently of the other, may be selected amongst metals, metal alloys, metal oxides, insulators, and semiconducting materials. In some embodiments, the material is or comprises an element of Groups IIIB, IVB, VB, VIB, VIIB, VIIIB, IB, IIB, IIIA, IVA and VA of block d of the Periodic Table of the Elements.

In some embodiments, the material is or comprises a transition metal selected from Groups IIIB, IVB, VB, VIB, VIIB, VIIIB, IB and IIB of block d the Periodic Table. In some embodiments, the transition metal is a metal selected from Sc, Ti, V, Cr, Mn, Fe, Ni, Cu, Zn, Y, Zr, Nb, Tc, Ru, Mo, Rh, W, Au, Pt, Pd, Ag, Mn, Co, Cd, Hf, Ta, Re, Os, Ir and Hg.

In some embodiments, the material is a semiconductor material selected from elements of Group I-VII, Group II-VI, Group III-V, Group IV-VI, Group III-VI, and Group IV semiconductors and combinations thereof.

In other embodiments, the semiconductor material is a Group I-VII semiconductors are CuCl, CuBr, CuI, AgCl, AgBr, AgI and the like.

In other embodiments, the semiconductor material is a Group II-VI material being selected from CdSe, CdS, CdTe, ZnSe, ZnS, ZnTe, HgS, HgSe, HgTe, CdZnSe, ZnO and any combination thereof.

In further embodiments, Group III-V material are selected from InAs, InP, InN, GaN, InSb, InAsP, InGaAs, GaAs, GaP, GaSb, AlP, AlN, AlAs, AlSb, CdSeTe, ZnCdSe and any combination thereof.

In additional embodiments, the semiconductor material is selected from Group IV-VI, the material being selected from PbSe, PbTe, PbS, PbSnTe, $Tl_2SnTe_5$ and any combination thereof.

In other embodiments, the material is or comprises an element of Group IV. In some embodiments, the material is selected from C, Si, Ge, Sn, Pb.

In some embodiments, the material is metal, metal alloys, or metal oxide. Non-limiting examples include ZnO, CdO, $Fe_2O_3$, $Fe_3O_4$, and $In_2O_3$.

In other embodiments, the material is selected amongst metal alloys and intermetallics of the above metal and/or transition metals.

In further embodiments, the material is selected from copper sulfides, selected in a non-limiting manner from $Cu_2S$, $Cu_2Se$, $CuInS_2$, $CuInSe_2$, $Cu_2(ZnSn)S_4$, $Cu_2(InGa)S_4$, $CuInS_2$, $CuGaS_2$, $CuAlS_2$ and mixed copper-iron sulfides such as $Cu_5FeS_4$ (Bornite) and $CuFeS_2$ (chalcopyrite).

In further embodiments, the material is or comprises a semiconductor material.

In some embodiments, in the core/shell SR systems of the invention, the core material is selected from InAs, InP, CdSe, ZnTe, ZnSe, and ZnSeTe. In other embodiments, each of the shell materials is selected from CdSe, CdS, CdSSe, CdZnSe, CdZnS, ZnSe, and ZnTe.

In some embodiments, the material of the elongated structure is selected from CdS, CdZnS, ZnS, ZnTe, and ZnTe/ZnS.

In some embodiments, the core/shell SR system of the invention is a core/shell(1/SR system selected from InAs/CdSe/CdS, InP/ZnTe/ZnS, InP/ZnSe/ZnTe, InP/ZnSe/CdS, InP/ZnSe/ZnS, ZnTe/ZnSe/ZnS, ZnSe/ZnTe/ZnS, ZnSeTe/ZnTe/ZnS, CdSe/CdSSe/CdS, CdSe/CdS/CdZnS, CdSe/CdZnSe/CdZnS, and CdSe/CdZnS/ZnS.

In some embodiments, the core/shell SR system of the invention is a core/shell(1)/shell(2) SR system selected from InAs/CdSe/ZnSe/CdS, and InP/ZnSe/ZnTe/ZnS.

As stated above, in the SR systems of the invention each of said first, second and further materials are selected such that each two adjacent materials are different from each other. In some embodiments, the first material may be a semiconductor and the further material may be a metal. In other embodiments, the first material may be one semiconductor material and the further material may be another semiconductor material. In further embodiments, each of the core and shell materials is a semiconductor material, provided that two adjacent materials are not the same.

In some embodiments, at least one of the first, second and further materials is a semiconductor. In further embodiments, at least one of the first, second and further materials is a metal.

In another aspect of the invention, there is provided a process for the manufacture of the SR systems of the invention. In FIG. 23, a process for the manufacture of a spherical core/spherical shell SR system is depicted. As a person of skill in the art would understand, this depicted process may be similarly adapted to the manufacture of other SR systems of the invention.

Generally, in the first step of the exemplified process of FIG. 23, the core is obtained by direct synthesis or from a commercial source. As noted above, the core may be a spherical core (as exemplified in FIG. 23) or an elongated core. The shells are grown on the core prior to the formation of the SR system. In some instances, a core/shell structure is pre-made, following known processes for the manufacture of core/shell nanostructures, and thereafter used in accordance with a process of the invention.

Thus, the invention provides a process for the production of a SR system comprising an elongated structure (rod-like structure, 10) embedded with a seed structure (20), wherein a core/shell structure is employed for obtaining a core/shell SR system, and a rod element is employed for obtaining a rod-in-rod SR system, the process comprising contacting said seed structure, in solution, with precursors of the elongated structure material.

In some embodiments, the process comprising:
obtaining a pre-made solution of seed structures (20), each of said seed structures (20) being selected from a rod element seed, a core/shell (spherical or non-spherical) seed and a core/multishell (spherical or non-spherical) seed;
contacting said seed structures (20), in solution, with a precursor solution of an elongated structure (10) material under conditions permitting elongated growth of said material onto the surface of said seed structure;
to thereby afford the SR systems.

In some embodiments, the process further comprises isolating the SR systems.

In some embodiments, the seed structure is a spherical (or elongated) core/shell(n) nanostructure and the process comprises:
providing a solution of core/shell(n) structures;
contacting said core/shell(n) structures with a precursor solution of the elongated structure material under conditions permitting elongated growth of said material onto the surface of shell(n); to thereby obtain a core/shell(n) SR system in accordance with the present invention.

As used herein, the core/shell(n) designates a core/shell seed having n shells, wherein n is selected from 1 to 30.

In other embodiments, the seed structure is a rod element and the process comprises:
providing a solution of rod elements;
contacting said rod elements with a precursor solution of the elongated structure material under conditions permitting elongated growth of said material onto the surface of said rod elements; to thereby obtain a rod-in-rod SR system in accordance with the present invention.

The contacting step of the seed structure (core/shell or rod element) with precursors of the elongated structure material is carried out, in solution, by adding, e.g., injection, the seed structure together with precursors of the elongated structure material into a growth solution, at an appropriate temperature. In some embodiments, the temperature is higher than 80° C. In other embodiments, the temperature is higher than 200° C.

In some embodiments, the temperature range is between 80° C. to 400° C. In other embodiments the temperature range is between 200° C. to 400° C. In further embodiments the temperature range is between 120° C. to 380° C. In still other embodiments the temperature range is between 200° C. to 300° C.

In some embodiments, the solution is swiftly injected into a growth solution.

The growth solution, in which the SR systems of the invention are grown, may comprise of additional precursors for building the elongated structure, organic ligands which support elongated growth, and organic solvents and ligands used for dispersing the seeds structures and dissolving the other ligands. The growth solution provides the seeds, which act as nucleation center for the formation of the enveloping shell(s), and can also provide ligands for directing the growth direction of the rod shaped shell, and ligands for improving the solubility of ligands or dispersing of seeds in the main solution flask.

Generally and without wishing to be bound by theory, the elongated geometry of the nanoparticle SR system of the invention may be controlled by several parameters, including: the crystalline phase of the outer shell material, as discussed hereinabove, and the conditions under which the elongated growth is carried out.

In some embodiments, the material of the outer shell of the core/shell nanostructure is characterized by an elongated crystalline phase, and is thus capable of inducing elongated structure growth. In some other embodiments, the elongated growth is achieved by employing a growth temperature to enable conversion to the anisotropic crystalline phase.

In further embodiments, the anisotropic growth is achieved by using ligands which attach preferentially to certain facets of said seed nanostructure (to thereby render them less-reactive), thus promoting elongated growth along reactive facets. In many cases, combination of strong attaching ligands and weak attaching ligands lead to anisotropic growth. In general, long tail phosphonic acid ligands are strong attaching molecules used for directional growth. Weak ligands include oleic acid, oleyl amine and phosphine oxides. A broad spectrum selection of ligands, which may be used in accordance with the present invention, may be derived theoretically using the Bravais-Friedel Donnay-Harker theory and the growth morphology method (see for example: (1) A. Bravais, Etudes Crystall-ographiques, Academie des Sciences, Paris (1913); (2) J. D. H. Donnay and D. Harker, Amer. Mineralogist, 22, 463 (1935); (3) Z. Berkovitch-Yellin, J. Am. Chem. Soc., 107, 8239 (1985) and R. Docherty, G. Clydesdale, K. J. Roberts, P. Bennema., J. Phys. D: Appl. Phys., 24, 89 (1991).

In some embodiments, the ligands used with anionic precursors are selected amongst trioctylphosphine (TOP) and tributylphosphine (TBP).

In some embodiments, the weak ligands are selected from trioctylphosphine oxide (TOPO), dodecyl amine (DDA), tetradecyl amine (TDA), hexadecyl amine (HDA), octadecyl amine (ODA) and oleic acid (OA).

In further embodiments, the strong ligands are selected from dodecylphosphonic acid (DDPA), tridecylphosphonic acid (TDPA), octadecylphosphonic acid (ODPA), hexylphosphonic acid (HPA) and thiols.

In further embodiments, the anisotropic growth is achieved by using high concentration of precursors in solution. The precursors may be selected from the following:

Metal precursors as cations, where "M" represents the metal atom, include:

oxides selected from $M_2O$, $MO$, $M_2O_3$, $MO_2$, $M_2O_2$, $MO_3$, $M_3O_4$, $MO_5$, and $M_2O_7$;

acetates (the group $CH_3COO^-$, abbreviated $AcO^-$) selected from $AcOM$, $AcO_2M$, $AcO_3M$, and $AcO_4M$;

acetates hydrates (the group $CH_3COO^-$, abbreviated $AcO^-$) selected from $AcOM.xH_2O$, $AcO_2M.xH_2O$, $AcO_3M.xH_2O$, and $AcO_4M.xH_2O$, wherein x varies based on the nature of M;

acetylacetonates (the group $C_2H_7CO_2^-$, abbreviated $AcAc^-$) selected from $AcAcM$, $AcAc_2M$, $AcAc_3M$, and $AcAc_4M$;

acetylacetonate hydrates (the group $C_2H_7CO_2^-$, abbreviated $AcAc^-$) selected from $AcAcM.xH_2O$, $AcAc_2M.xH_2O$, $AcAc_3M.xH_2O$, and $AcAc_4M.xH_2O$, wherein x varies based on the nature of M;

chlorides selected from $MCl$, $MCl_2$, $MCl_3$, $MCl_4$, $MCl_5$, and $MCl_6$;

chlorides hydrates selected from $MCl.xH_2O$, $MCl_2.xH_2O$, $MCl_3.xH_2O$, $MCl_4.xH_2O$, $MCl_5.xH_2O$, and $MCl_6.xH_2O$, wherein x varies based on the nature of M;

bromides selected from $MBr$, $MBr_2$, $MBr_3$, $MBr_4$, $MBr_5$, and $MBr_6$;

bromides hydrates selected from $MBr.xH_2O$, $MBr_2.xH_2O$, $MBr_3.xH_2O$, $MBr_4.xH_2O$, $MBr_5.xH_2O$, and $MBr_6.xH_2O$, wherein x varies based on the nature of M;

iodides selected from $MI$, $MI_2$, $MI_3$, $MI_4$, $MI_5$, and $MI_6$;

iodides hydrates selected from $MI.xH_2O$, $MI_2.xH_2O$, $MI_3.xH_2O$, $MI_4.xH_2O$, $MI_5.xH_2O$, and $MI_6.xH_2O$, wherein x varies based on the nature of M;

carboxylates (abbreviated $RCO_2^-$, and including acetates) selected from $MRCO_2$, $M(RCO_2)_2$, $M(RCO_2)_3$, $M(RCO_2)_4$, $M(RCO_2)_5$, and $M(RCO_2)_6$;

carboxylates hydrates (abbreviated $RCO_2^-$) selected from $MRCO_2.xH_2O$, $M(RCO_2)_2.xH_2O$, $M(RCO_2)_3.xH_2O$, $M(RCO_2)_4.xH_2O$, $M(RCO_2)_5.xH_2O$, and $M(RCO_2)_6.xH_2O$, wherein x varies based on the nature of M;

nitrates selected from $MNO_3$, $M(NO_3)_2$, $M(NO_3)_3$, $M(NO_3)_4$, $M(NO_3)_5$, and $M(NO_3)_6$;

nitrates hydrates selected from $MNO_3.xH_2O$, $M(NO_3)_2.xH_2O$, $M(NO_3)_3.xH_2O$, $M(NO_3)_4.xH_2O$, $M(NO_3)_5.xH_2O$, and $M(NO_3)_6.xH_2O$, wherein x varies based on the nature of M;

nitrites selected from $MNO_2$, $M(NO_2)_2$, $M(NO_2)_3$, $M(NO_2)$, $M(NO_2)_5$, and $M(NO_2)_6$;

nitrites hydrates selected from $MNO_2.xH_2O$, $M(NO_2)_2.xH_2O$, $M(NO_2)_3.xH_2O$, $M(NO_2)_4.xH_2O$, $M(NO_2)_5.xH_2O$, and $M(NO_2)_6.xH_2O$, wherein x varies based on the nature of M;

cyanates selected from $MCN$, $M(CN)_2$, $M(CN)_3$, $M(CN)_4$, $M(CN)_5$, $M(CN)_6$;

cyanates hydrates selected from $MCN.xH_2O$, $M(CN)_2.xH_2O$, $M(CN)_3.xH_2O$, $M(CN)_4.xH_2O$, $M(CN)_5.xH_2O$, and $M(CN)_6.xH_2O$, wherein x varies based on the nature of M;

sulfides selected from $M_2S$, $MS$, $M_2S_3$, $MS_2$, $M_2S_2$, $MS_3$, $M_3S_4$, $MS_5$, and $M_2S_7$;

sulfides hydrates selected from $M_2S.xH_2O$, $MS.xH_2O$, $M_2S_3.xH_2O$, $MS_2.xH_2O$, $M_2S_2.xH_2O$, $MS_3.xH_2O$, $M_3S_4.xH_2O$, $MS_5.xH_2O$, and $M_2S_7.xH_2O$, wherein x varies based on the nature of M;

sulfites selected from $M_2SO_3$, $MSO_3$, $M_2(SO_3)_3$, $M(SO_3)_2$, $M_2(SO_3)_2$, $M(SO_3)_3$, $M_3(SO_3)_4$, $M(SO_3)_5$, and $M_2(SO_3)_7$;

sulfites hydrates selected from $M_2SO_3.xH_2O$, $MSO_3.xH_2O$, $M_2(SO_3)_3.xH_2O$, $M(SO_3)_2.xH_2O$, $M_2(SO_3)_2.xH_2O$, $M(SO_3)_3.xH_2O$, $M_3(SO_3)_4.xH_2O$, $M(SO_3)_5.xH_2O$, and $M_2(SO_3).xH_2O$, wherein x varies based on the nature of M;

hyposulfite selected from $M_2SO_2$, $MSO_2$, $M_2(SO_2)_3$, $M(SO_2)_2$, $M_2(SO_2)_2$, $M(SO_2)_3$, $M_3(SO_2)_4$, $M(SO_2)_5$, and $M_2(SO_2)_7$;

hyposulfite hydrates selected from $M_2SO_2.xH_2O$, $MSO_2.xH_2O$, $M_2(SO_2)_3.xH_2O$, $M(SO_2)_2.xH_2O$, $M_2(SO_2)_2.xH_2O$, $M(SO_2)_3.xH_2O$, $M_3(SO_2)_4.xH_2O$, $M(SO_2)_5.xH_2O$, and $M_2(SO_2)_7.xH_2O$, wherein x varies based on the nature of M;

sulfate selected from $M_2SO_3$, $MSO_3$, $M_2(SO_3)_3$, $M(SO_3)_2$, $M_2(SO_3)_2$, $M(SO_3)_3$, $M_3(SO_3)_4$, $M(SO_3)_5$, and $M_2(SO_3)_7$;

sulfate hydrates selected from $M_2SO_3.xH_2O$, $MSO_3.xH_2O$, $M_2(SO_3)_3.xH_2O$, $M(SO_3)_2.xH_2O$, $M_2(SO_3)_2.xH_2O$, $M(SO_3)_3.xH_2O$, $M_3(SO_3)_4.xH_2O$, $M(SO_3)_5.xH_2O$, and $M_2(SO_3)_7.xH_2O$, wherein x varies based on the nature of M;

thiosulfate selected from $M_2S_2O_3$, $MS_2O_3$, $M_2(S_2O_3)_3$, $M(S_2O_3)_2$, $M_2(S_2O_3)_2$, $M(S_2O_3)_3$, $M_3(S_2O_3)_4$, $M(S_2O_3)_5$, and $M_2(S_2O_3)_7$;

thiosulfate hydrates selected from $M_2S_2O_3.xH_2O$, $MS_2O_3.xH_2O$, $M_2(S_2O_3)_3.xH_2O$, $M(S_2O_3)_2.xH_2O$, $M_2(S_2O_3)_2.xH_2O$, $M(S_2O_3)_3.xH_2O$, $M_3(S_2O_3)_4.xH_2O$, $M(S_2O_3)_5.xH_2O$, and $M_2(S_2O_3)_7.xH_2O$, wherein x varies based on the nature of M;

dithionites selected from $M_2S_2O_4$, $MS_2O_4$, $M_2(S_2O_4)_3$, $M(S_2O_4)_2$, $M_2(S_2O_4)_2$, $M(S_2O_4)_3$, $M_3(S_2O_4)_4$, $M(S_2O_4)_5$, and $M_2(S_2O_4)_7$;

dithionites hydrates selected from $M_2S_2O_4.xH_2O$, $MS_2O_4.xH_2O$, $M_2(S_2O_4)_3.xH_2O$, $M(S_2O_4)_2.xH_2O$, $M_2(S_2O_4)_2.xH_2O$, $M(S_2O_4)_3.xH_2O$, $M_3(S_2O_4)_4.xH_2O$, $M(S_2O_4)_5.xH_2O$, and $M_2(S_2O_4)_7.xH_2O$, wherein x varies based on the nature of M;

phosphates selected from $M_3PO_4$, $M_3(PO_4)_2$, $MPO_4$, and $M_4(PO_4)_3$;

phosphates hydrates selected from $M_3PO_4.xH_2O$, $M_3(PO_4)_2.xH_2O$, $MPO_4.xH_2O$, and $M_4(PO_4)_3.xH_2O$, wherein x varies based on the nature of M;

carbonates selected from $M_2CO_3$, $MCO_3$, $M_2(CO_3)_3$, $M(CO_3)_2$, $M_2(CO_3)_2$, $M(CO_3)_3$, $M_3(CO_3)_4$, $M(CO_3)_5$, $M_2(CO_3)_7$;

carbonate hydrates selected from $M_2CO_3.xH_2O$, $MCO_3.xH_2O$, $M_2(CO_3)_3.xH_2O$, $M(CO_3)_2.xH_2O$, $M_2(CO_3)_2.xH_2O$, $M(CO)_3.xH_2O$, $M_3(CO_3)_4.xH_2O$, $M(CO_3)_5.xH_2O$, and $M_2(CO_3)_7.xH_2O$, wherein x varies based on the nature of M;

hypochlorites/chlorites/chlorates/cerchlorates (abbreviated $ClO_n^-$, n=1, 2, 3, 4) selected from $MClO_n$, $M(ClO_n)_2$, $M(ClO_n)_3$, $M(ClO_n)_4$, $M(ClO_n)_5$, and $M(ClO_n)_6$;

hypochlorites/chlorites/chlorates/perchlorates hydrates selected from $MClO_n.xH_2O$, $M(ClO_n)_2.xH_2O$, $M(ClO_n)_3.xH_2O$, $M(ClO_n)_4.xH_2O$, $M(ClO_n)_5.xH_2O$, and $M(ClO_n)_6.xH_2O$, wherein x varies based on the nature of M, and n=1, 2, 3, 4;

hypobromites/bromites/bromates/berbromates (abbreviated $BrO_n^-$, n=1, 2, 3, 4) selected from $MBrO_n$, $M(BrO_n)_2$, $M(BrO_n)_3$, $M(BrO_n)_4$, $M(BrO_n)_5$, and $M(BrO_n)_6$;

hypobromites/bromites/bromates/perbromates hydrates selected from $MBrO_n.xH_2O$, $M(BrO_n)_2.xH_2O$, $M(BrO_n)_3.xH_2O$, $M(BrO_n)_4.xH_2O$, $M(BrO_n)_5.xH_2O$, and $M(BrO_n)_6.xH_2O$, wherein x varies based on the nature of M, and n=1, 2, 3, 4;

hypoiodites/iodites/iodates/periodates (abbreviated $IO_n^-$, n=1, 2, 3, 4) selected from $MIO_n$, $M(IO_n)_2$, $M(IO_n)_3$, $M(IO_n)_4$, $M(IO_n)_5$, and $M(IO_n)_6$;

hypochlorites/chlorites/chlorates/perchlorates hydrates selected from $MIO_n.xH_2O$, $M(IO_n)_2.xH_2O$, $M(IO_n)_3.xH_2O$, $M(IO_n)_4.xH_2O$, $M(IO_n)_5.xH_2O$, and $M(IO_n)_6.xH_2O$, wherein x varies based on the nature of M, and n=1, 2, 3, 4;

Metal alkyls;

Metal alkoxides;

Metal amines;

Metal phosphines;

Metal thiolates;

Combined cation-anion single source precursors, i.e., molecules that include both cation and anion atoms, for example of the formula $M(E_2CNR2)_2$ (M=Zn, Cd, Pb, Ga, In, Hg, E=S, P, Se, Te, O, As, and R=alkyl, amine alkyl, silyl alkyl, phosphoryl alkyl, phosphyl alkyl).

In some embodiments, each of the SR systems of the invention is coated, partially or wholly with a plurality of passivating ligands. Exemplary passivating ligands are trioctylphosphine (TOP), tributylphosphine (TBP), trioctylphosphine oxide (TOPO), dodecyl amine (DDA), tetradecyl amine (TDA), hexadecyl amine (HDA), octadecyl amine (ODA), oleic acid (OA), dodecylphosphonic acid (DDPA), tridecylphosphonic acid (TDPA), octadecylphosphonic acid (ODPA), hexylphosphonic acid (HPA) and thiols.

The tailoring of the SR systems of the invention provides the opportunity to control the optical and electronic properties of the SR systems (nanoparticles), as demonstrated by the nanoparticles' enhanced fluorescence efficiency and polarized emission. Furthermore, the SR systems enable the tailoring of the energetic electronic levels, i.e., aligning the band offset of the different elements in the system.

Thus, the SR systems of the invention may be characterized by any energy band configuration (type I, type II and type III). Generally, for application purposes, the SR systems of the invention are tailored to adopt either a type I or a type II band configuration. "Type I" refers to the band configuration of a nanostructure, wherein the band offset of two adjacent materials in the SR system (e.g., core and shell) is such that the energetic positions of the conduction and valance band edges of one material are within the conduction and valance band-edges of the other adjacent material. "Type II" refers to the staggered band configuration, wherein the energetic position of the conduction band edge of one material lies between the conduction and valance band edges of the other material, and the valance band edge of the first material lies below that of the second material. Quasi type-II band configuration are also possible, where either conduction or valance band edge are similar in energy.

The SR systems of the invention may be utilized for a variety of electronic and optical applications, such in the communication industries as well as in other optical applications such as fluorescence, lighting, displays, marking, biomedicine, sensors, absorbing or lasing materials, etc.

Thus, the invention also provides a device incorporating at least one SR system according to the present invention. In some embodiments, the device is selected from a light conversion layer, a transmitter, a laser, a Q-switch, a switch, an optical switch, an optical fiber, a gain device, an amplifier, a display, a detector, a communication system, a light emitting diode, a solar cell, and a sensor.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1A depicts a spherical core/shell structure embedded within an elongated structure, wherein the core is of a first material, a spherical shell of a second material, the core/shell structure positioned non-concentrically within the elongated structure composed of a third material.

FIG. 1R depicts an elongated core/shell structure embedded within an elongated structure, wherein the elongated core is of a first material, the elongated shell of a second material, the core/shell structure positioned within the elongated structure composed of a material which is of a third material. As may be noted, the elongated core is positioned concentrically with respect of the elongated structure but non-concentrically with respect of the elongated shell.

FIGS. 4A-B are TEM images depicting the growth of InAs/CdSe/CdS SRs during synthesis:
  FIG. 4A—After 2 min, 59.6 nm×5.5 nm rods are obtained, and
  FIG. 4B—HR-TEM and FFT indicating the direction of the growth. Inset: magnification of the FFT area.

FIG. 5 depicts the Powder XRD measurements of: (a) InAs/CdSe core/shell, and (b) InAs/CdSe/CdS core/shell/rod particles. The expected positions and intensities of the most intense XRD reflections for bulk fcc zincblende (ZB) InAs, bulk fcc (ZB) CdSe, bulk hexagonal (wurtzite) CdSe, and bulk hexagonal (wurtzite) CdS are depicted in upper and lower panels. The XRD pattern of the InAs/CdSe core/shell (a) matches well the highly overlapping reflections of ZB InAs and ZB CdSe. No indication for a wurtzite CdSe structure can be found in the reflections, indicating that the CdSe shell obtains a fcc structure. Upon formation of the CdS rod, peaks which match hexagonal bulk CdS become dominant (b).

FIG. 6A depicts normalized emission of InAs NCs (dashed line), InAs/CdSe core/shell (thin solid line), InAs/CdSe/CdS SRs of same core/shell seeds and different rod shells (large dash line, thick solid line).
FIG. 6B depicts stability measurements of NCs suspended in toluene. The particles were excited by 532 nm 66 mW laser under ambient atmosphere. InAs cores (large dash line) lose up to 70% of their fluorescence after 3 hours, while InAs/CdSe core/shell (thick solid line) lose up to 15% of their fluorescence after 20 hours and InAs/CdSe/CdS SRs were stable for 20 hours and did not lose their fluorescence (small dash line).

FIGS. 7A-D present parallel (solid line) and perpendicular (dashed line) polarized emission spectra measurements of:
  FIG. 7A—spherical InAs/CdSe core/shell NCs embedded in a polymer film, stretched ×3.5 along the z-axis.
  FIG. 7B—seeded rods embedded in a non-stretched stretched polymer film. In both FIG. 7A and FIG. 7B no polarization was detected.
  FIG. 7C—seeded rods embedded in a polymer film stretched ×3.5 along the z-axis showing polarization of 30%.
  FIG. 7D—seeded rods embedded in a polymer film stretched ×5 along the z axis, showing polarization of 47%.
  Insets illustrate the arrangement of the particles in the film. Polarization was calculated by $P=(I_\parallel-I_\perp)/(I_\parallel+I_\perp)$.

FIG. 12A a TEM image of core CdSe rods with length of 8 nm and width of 2.4 nm, and
  FIG. 12B a TEM image of the obtained CdSe/CdS rod-in-rod SRs of length 45 nm and width of 5 nm. Scale bar 20 nm.

FIG. 15 is an illustration of band diagram of CdSe/CdS rod-in-rod particles.

FIGS. 16A-H are TEM images of CdSe/CdS rod-in-rod system prepared from different CdSe seeds:
  FIG. 16A—6.5 nm×2.4 nm CdSe rods,
  FIG. 16B—rods (FIG. 16A) embedded in 15 nm×4.5 nm CdS rod shells,
  FIG. 16C—9 nm×2.2 nm CdSe rods,
  FIG. 16D—rods (FIG. 16C) embedded in 40 nm×3.8 nm CdS rod shell,
  FIG. 16E—20 nm×2.5 nm CdSe rods,
  FIG. 11F—rods (FIG. 11E) embedded in 45 nm×5.2 nm CdS rod shells,
  FIG. 16G—40 nm×2.5 nm CdSe rods, and
  FIG. 16H—rods (FIG. 16G) embedded in 60 nm×5.5 nm CdS rod shells. Scale bars are 20 nm. Insets show schematic diagrams of the particles.

FIGS. 17A-B are:
  FIG. 17A presents the elemental analysis (EDS line scan, 0.5 nm step size, smoothed) along the length of a single rod-in-rod (20 nm×2.5 nm CdSe rods in 45 nm×5.2 nm CdS rod). The particle's schematic diagram is depicted at the bottom.

FIG. 17B presents TEM images of Au growth on the same rod-in-rod sample, showing the growth of gold ellipsoids over the rods (scale bar is of 20 nm), as is depicted schematically in FIG. 12A.

FIG. 18A—absorption and photoluminescence spectra of 9 nm×2.2 nm CdSe rod embedded in a 40 nm×3.8 nm CdS.

FIG. 18B—absorption and photoluminescence spectra of 20 nm×2.5 nm CdSe rod embedded in a 45 nm×5.2 nm CdS. Insets shows core CdSe rod absorption and photoluminescence.

FIG. 18C illustrates the band potential profile of CdSe@CdS rod-in-rod system (as generally depicted in FIG. 15)

FIGS. 19A-D are:

FIG. 19A—emission of CdSe/CdS core/shell (core diameter 3.5 nm, shell thickness of 0.8 nm) solution in toluene excited at their band edge using horizontally polarized light, both parallel and perpendicular emission components overlap, showing negligible emission polarization;

FIG. 19B—emission of CdSe/CdS rod-in-rod solution in toluene excited at their band edge using horizontally polarized light. The vertical emission component is shown in thin line and horizontal component is shown thick line. The parallel and perpendicular emission components do not overlap, resulting in a significant emission polarization.

FIG. 19C presents a diagram indicating the lab and the rod coordinates system. The lab coordinates: a—the excitation ray path, b—the collection path, and c—the vertical polarization direction. The rod coordinates system: z—the rod main axis and xy—the plane perpendicular to the main axis.

FIG. 19D—anisotropy of different core/shell systems measured using the photoselection method excited at the band-edge, at 530 nm, at 470 nm and 350 nm. Particles diagrams are shown in relative aspect ratios.

FIGS. 20A-C are:

FIG. 20A—photoselection anisotropy map as a function of the single particle absorption and emission polarizations. Four thick lines may be traced in the figure from the top right-hand side corner. The $1^{st}$ and $3^{rd}$ thick lines are the experimental anisotropy values obtained for rod-in-rod 3 excited at the band edge (right) and at 355 nm (left), and $2^{nd}$ and $4^{th}$ thick lines are the experimental anisotropy values obtained for rod-in-rod 2 excited at the band edge (right) and at 355 nm (left). Horizontal doted lines indicate the polarization of the band edge emission under the assumption that the absorption is completely polarized (p=1).

FIG. 20B—polarization of the band-edge emission obtained from FIG. 20A as a function of the core's aspect ratio. The X marks indicate spherical core shell, circles indicate core/shell in rod samples, and squares indicate rod-in-rod samples. Dashed line is a guide to the eye, demonstrating the abrupt increase in polarization for an AR of ~3.

FIG. 20C—polarization of the absorption obtained from FIG. 20A as a function of the core AR for excitation at 530 nm, 470 nm and 350 nm. Dashed lines show the average values of the obtained polarization for each excitation wavelength.

DETAILED DESCRIPTION OF EMBODIMENTS

Core/Shell Seed Embedded in an Elongated Structure

Example A1: InAs/CdSe/CdS

The synthesis of InAs/CdS SR systems according to the present invention was performed according to the seeded-growth approach, by rapidly injecting a mixture of InAs NCs, grown according to literature [36] and sulfur precursor into a hot solution of cadmium precursor and two phosphonic acids in tri-n-octylphosphine oxide.

Figure 1A:
FIGS. 1A-R depict 18 different SR systems in accordance with the present invention.
Figure 1B:
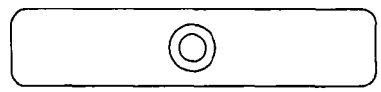
FIG. 1B depicts a spherical core/shell structure embedded within an elongated structure, wherein the core is of a first material, a spherical shell of a second material, the core/shell structure positioned concentrically within the elongated structure composed of a third material.
Figure 1C:
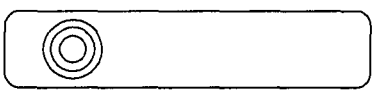
FIG. 1C depicts a spherical core/shell structure embedded within an elongated structure, wherein the core is of a first material, a spherical shell(1) of a second material, a spherical shell(2) of a third material, the core/shell structure positioned non-concentrically within the elongated structure composed of a material which is different from the shell(2) material but may be the same as any of the core and shell(1) materials.
Figure 1D:
FIG. 1D depicts a spherical core/shell structure embedded within an elongated structure, wherein the core is of a first material, a spherical shell(1) of a second material, a spherical shell(2) of a third material, the core/shell structure positioned concentrically within the elongated structure composed of a material which is different from the shell(2) material but may be the same as any of the core and shell(1) materials.
Figure 1E:
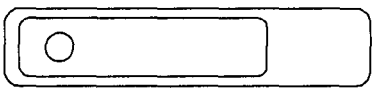
FIG. 1E depicts an elongated core/shell structure embedded within an elongated structure, wherein the spherical core is of a first material, an elongated shell of a second material, the core/shell structure positioned within the elongated structure composed of a material which is of a third material. As may be noted, the core is positioned non-concentrically with respect of the shell and the shell is positioned non-concentrically with respect of the elongated structure.
Figure 1F:
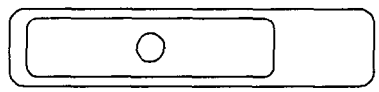
FIG. 1F depicts an elongated core/shell structure embedded within an elongated structure, wherein the spherical core is of a first material, an elongated shell of a second material, the core/shell structure positioned within the elongated structure composed of a material which is of a third material. As may be noted, the core is positioned concentrically with respect of the shell and the shell is positioned non-concentrically with respect of the elongated structure.
Figure 1G:
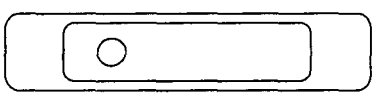
FIG. 1G depicts an elongated core/shell structure embedded within an elongated structure, wherein the spherical core is of a first material, an elongated shell of a second material, the core/shell structure positioned within the elongated structure composed of a material which is of a third material. As may be noted, the core is positioned non-concentrically with respect of the shell and the shell is positioned concentrically with respect of the elongated structure.
Figure 1H:
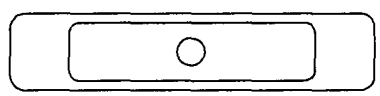
FIG. 1H depicts an elongated core/shell structure embedded within an elongated structure, wherein the spherical core is of a first material, an elongated shell of a second material, the core/shell structure positioned within the elongated structure composed of a material which is of a third material. As may be noted, the elongated core/shell structure is positioned concentrically with respect of the elongated structure.
Figure 1I:
FIG. 1I depicts an elongated core/shell structure embedded within an elongated structure, wherein the spherical core is of a first material, a spherical shell(1) is a second material, an elongated shell of a further material, the core/shell structure positioned within the elongated structure composed of a material which is of a third material. As may be noted, the spherical core/shell(1) is positioned non-concentrically with respect of the elongated shell and the elongated shell is positioned non-concentrically with respect of the elongated structure.
Figure 1J:
FIG. 1J depicts an elongated core/shell structure embedded within an elongated structure, wherein the spherical core is of a first material, a spherical shell(1) is a second material, an elongated shell of a further material, the core/shell structure positioned within the elongated structure composed of a material which is of a third material. As may be noted, the spherical core/shell(1) is positioned concentrically with respect of the elongated shell which is positioned non-concentrically with respect of the elongated structure.
Figure 1K:
FIG. 1K depicts an elongated core/shell structure embedded within an elongated structure, wherein the spherical core is of a first material, a spherical shell(1) is a second material, an elongated shell of a further material, the core/shell structure positioned within the elongated structure composed of a material which is of a third material. As may be noted, the spherical core/shell(1) is positioned non-concentrically with respect of the elongated shell and the elongated shell is positioned concentrically with respect of the elongated structure.
Figure 1L:
FIG. 1L depicts an elongated core/shell structure embedded within an elongated structure, wherein the spherical core is of a first material, a spherical shell(1) is a second material, an elongated shell of a further material, the core/shell structure positioned within the elongated structure composed of a material which is of a third material. As may be noted, the spherical core/shell(1)/elongated shell is positioned concentrically with respect of the elongated structure.
Figure 1M:
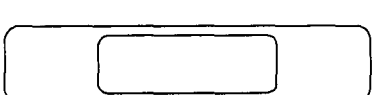
FIG. 1M depicts a rod-in-rod seeded rod system according to the invention, wherein the rod-element is positioned concentrically with respect of the elongated structure.
Figure 1N:
FIG. 1N depicts a rod-in-rod seeded rod system according to the invention, wherein the rod-element is positioned non-concentrically with respect of the elongated structure.
Figure 1O:
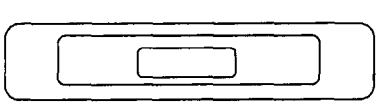
FIG. 1O depicts an elongated core/shell structure embedded within an elongated structure, wherein the elongated core is of a first material, the elongated shell of a second material, the core/shell structure positioned within the elongated structure composed of a material which is of a third material. As may be noted, the elongated core is positioned concentrically with respect to the elongated shell and the elongated core/shell structure is positioned concentrically with respect of the elongated structure.
Figure 1P:
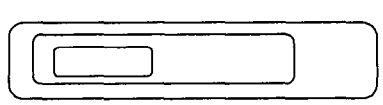
FIG. 1P depicts an elongated core/shell structure embedded within an elongated structure, wherein the elongated core is of a first material, the elongated shell of a second material, the core/shell structure positioned within the elongated structure composed of a material which is of a third material. As may be noted, the elongated core is positioned non-concentrically with respect of the elongated shell and the elongated core/shell structure is positioned non-concentrically with respect of the elongated structure.
Figure 1Q:
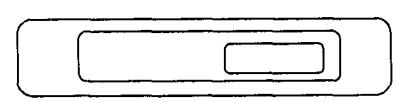
FIG. 1Q depicts an elongated core/shell structure embedded within an elongated structure, wherein the elongated core is of a first material, the elongated shell of a second material, the core/shell structure positioned within the elongated structure composed of a material which is of a third material. As may be noted, the elongated core is positioned non-concentrically with respect of the elongated shell and the elongated shell structure is positioned concentrically with respect of the elongated structure.
Figure 1R:
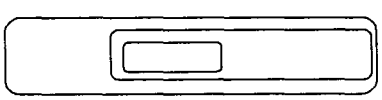
Figure 2:
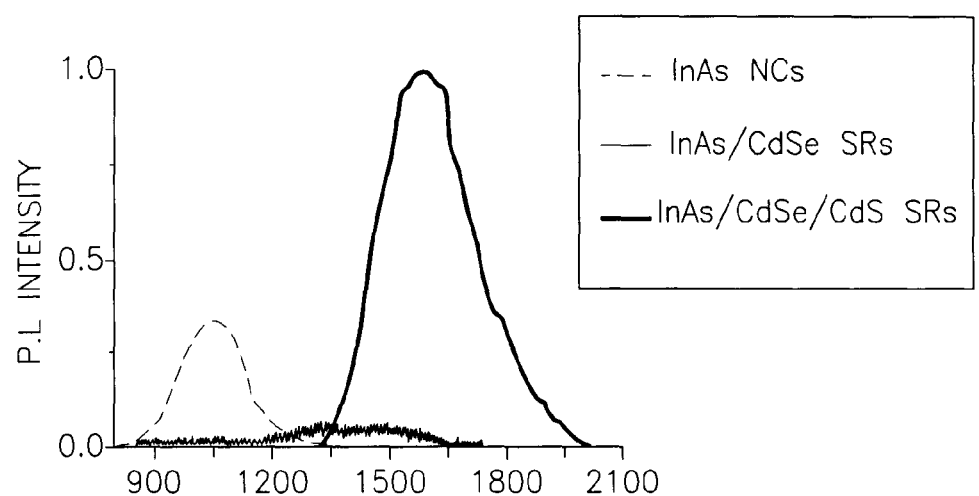
FIG. 2 presents the emission spectra of InAs NCs, InAs/CdS SRs and InAs/CdSe/CdS core/shell/rods. All spectra are normalized with respect to the peak intensity of the InAs/CdSe/CdS SRs.
Figure 3:
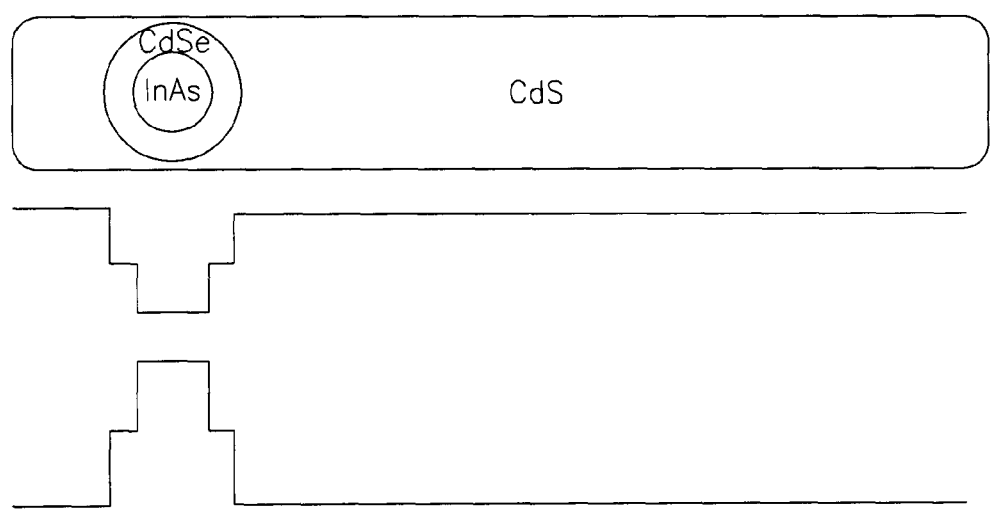
FIG. 3 depicts the valence and conduction band edges relative positions in InAs/CdSe/CdS core/shell/rod SR system in accordance with the invention.

As demonstrated in FIG. 2, in which the emission of InAs NCs and of InAs/CdS SR is shown, the growth of the CdS shell directly on top of the InAs seeds induced a large red shift (from 970 nm to 1500 nm) accompanied by a broadening of the emission peak and by a significant reduction of its intensity. This reduction can be attributed to formation of traps and intermediate states in the InAs/CdS interface as a results of large lattice mismatch between the two materials (6.058 Å for InAs and 5.832 Å for CdS fcc structures). To overcome the lattice mismatch problem, an intermediate layer was constructed on top of the core, forming a core-shell structure, which acted as the seed for the rod growth (FIG. 3). This additional intermediate layer provided a bridge for lattice matching between the core and rod materials and also acted as a passivation layer for dangling bonds of the InAs cores.

A buffer shell of CdSe was chosen for this task since the lattice constant is close to that of InAs (CdSe=6.05 Å). In addition, the band gap of CdSe forms a potential barrier for both electron and hole and it is expected to confine the exciton to the InAs core forming a type I system (FIG. 3). The formation of the buffer layer greatly increased the emission, as can be seen in FIG. 2.

The composition of the SR system was verified using energy dispersive spectroscopy (EDS) analysis. Elemental ratios of As:Se:S:Cd=1:1.6:36.5:46.2 were obtained, in good agreement with the expected values for SRs with InAs seed's radius of 2.3 nm, a two-monolayer thick CdSe shell and 5 nm×50 nm CdS rod.

FIGS. 4A and 4B present TEM images of the SRs with core/shell particles used as seeds. High-Resolution TEM analysis was performed on several SRs, as shown in FIG. 5 (line b). Fast Fourier Transform (FFT) analysis of the images indicated that the outer shell of the CdS had a hexagonal wurtzite structure. The growth direction of the rods was along the c-axis of the hexagonal structure, in agreement with XRD measurements, as can be seen in FIG. 5, and with previous results obtained for other CdS SRs systems [18-20]. The formation of a hexagonal rod was not trivial when considering the fact that the InAs core has a cubic structure [36,37], as epitaxial growth of hexagonal structures on top of cubic structures tend to yield branched architectures such as tetrapods [38,39,40].

Figure 6A:
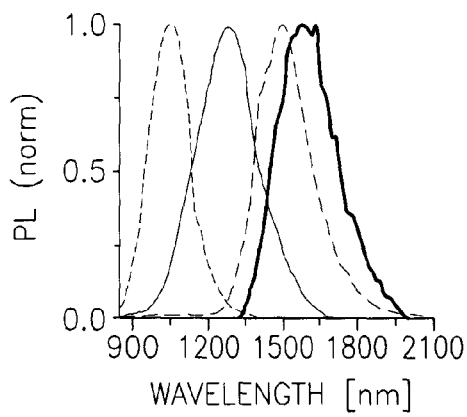
FIGS. 6A-6B are.

Formation of CdSe shell on top of the InAs core causes smearing of the absorption peaks accompanied by a red shift of the excitonic peak. The growth of CdS rod on top of the core/shell system significantly increases the absorption for wavelengths lower than 500 nm, because of the onset of absorption into the CdS rod transitions. In addition, upon the rod growth, the emission is red shifted significantly. The effect of the rod thickness and shape can be seen in FIG. 6A, where the emission of SRs with a diameter of 5.2 nm and more matches-like is 1445 nm, while rods of 5.5 nm diameter emit at 1600 nm. This effect can be attributed to changes in the particles' dimensions and to other effects, such as lattice strain.

Figure 6B:
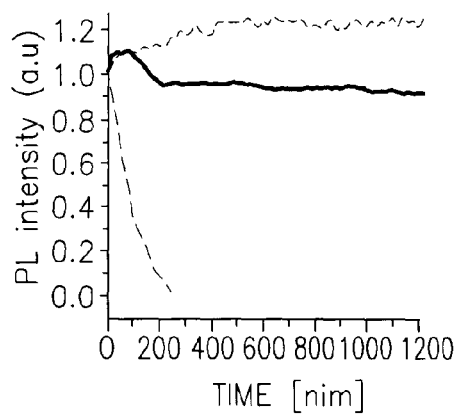

Photo-stability measurements were performed by irradiation of the NCs suspended in toluene using 66 mW 532 nm laser under ambient atmosphere (FIG. 6B). The SRs exhibited a stable emission for 20 hours, while InAs/CdSe core/shells show a 15% reduction in the emission over the same period of time. The high stability of both systems in comparison to InAs NCs can be ascribed to the good passivation of the InAs core by the CdSe shell. However, the existence of another shell in the SRs decreases the diffusion of oxygen to the core, and thus reduces the arsenic oxidation in the core and increases the stability.

Figure 7A:
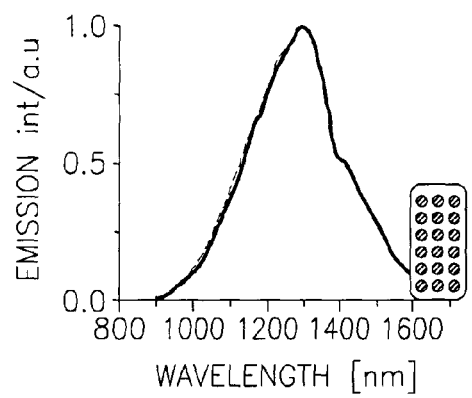
Figure 7B:
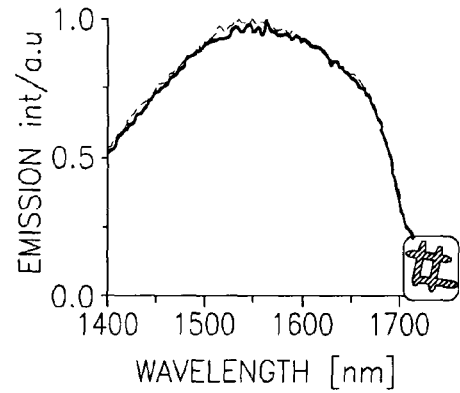
Figure 7C:
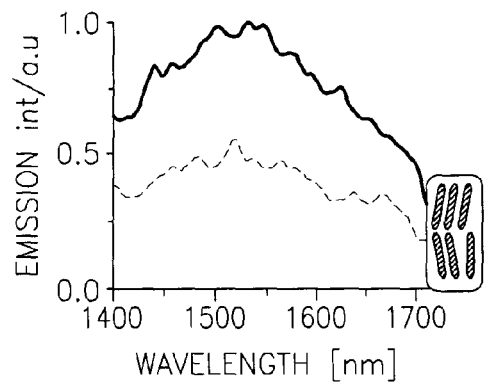
Figure 7D:
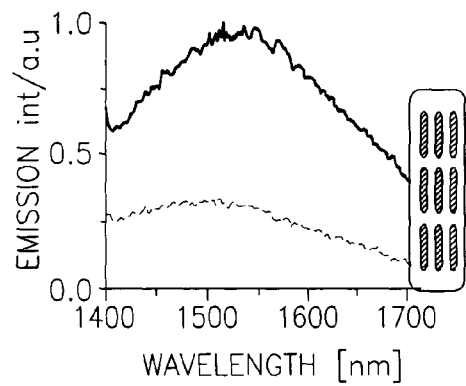

Polarization measurements were performed on SRs embedded in a stretched polymer film (FIGS. 7A-D). Previous works have shown that type I SRs emit polarized light, in contrast to spherical core/shell systems [9]. While InAs/CdSe core/shell dots (FIG. 7A) and non-stretched disordered SRs film (FIG. 7B) did not show any polarization, in stretched film the polarization goes up to 47% (FIGS. 7C-D). Polarization measurements indicate that the InAs/CdSe/CdS SRs emit polarized light, and that the polarization is dictated by the spatial alignment of the rods within the polymer matrix. The degree of the polarization (47%) is similar to that of InAs nano rods of aspect ratio of approximately 1.5 as was shown in recent theoretical works [41].

Example A2: InAs/CdSe/ZnSe/CdS

Figure 8:
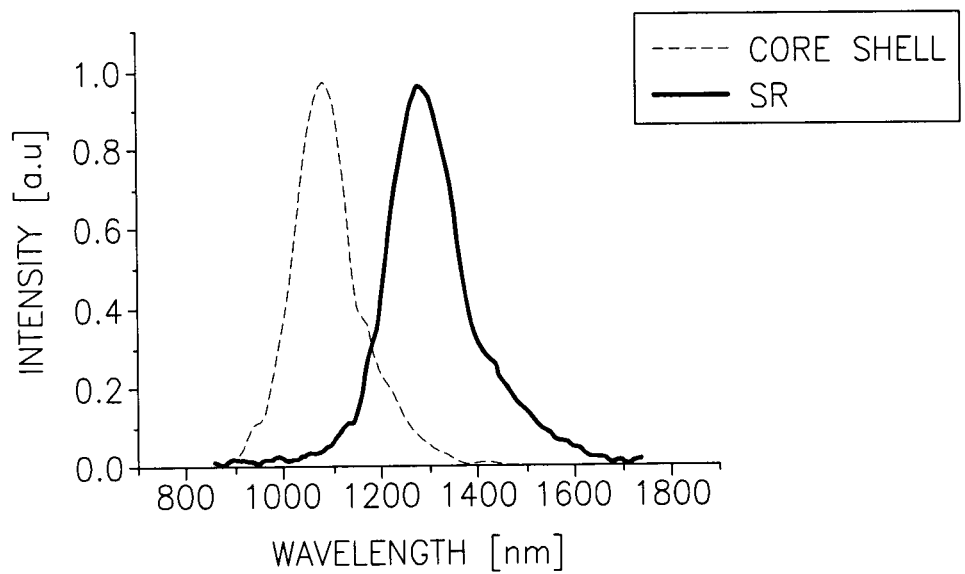
FIG. 8 presents the emission spectra of InAs/CdSe/ZnSe (dashed line) and InAs/CdSe/ZnSe/CdS (solid line).

In this example, an additional shell of ZnSe was grown on the InAs/CdSe core/shell, using a layer by layer (LBL) method. Formation of the second shell was aimed at increasing the potential barrier, thus leading to a decrease in the red shift of the emission (from 1600 nm to 1400 nm) and enable further control of the band gap energy. Controlling the shift is achieved by changing the thickness of the different shells (FIG. 8).

Example A3: InP/ZnSe/CdS

Another kind of combination between II-VI and III-V materials was achieved by using InP as core. The band gap of bulk InP (1.34 eV) is higher than the InAs (0.35 eV), resulting a shorter wavelength emission, and enabled to reach the visible-NIR spectrum range (500-900). This range is of high interest for lighting, displays and biological applications. InP/ZnSe quantum dots were synthesized by a drop-wise addition of Zn and Se precursors on the pre-synthesized InP cores. This was done either by alternating injections of the Zn and the Se precursors (using the layer-by-layer method) or by a continuous injection of a mixture of both precursors. Another possible method for achieving InP/ZnSe core/shell was by seeded growth of the ZnSe shell, in which the InP cores were mixed with the Se precursor and injected rapidly to a heated mixture of the Zn precursor and ligands (long chained amines, phosphineoxides, etc.)

The core/shell seeds are injected to the growth solution of the CdS rod as described above to form InP/ZnSe seeded CdS nanorods.

Example A4: InP/ZnSe/ZnTe$_x$S$_{1-x}$

Figure 9:
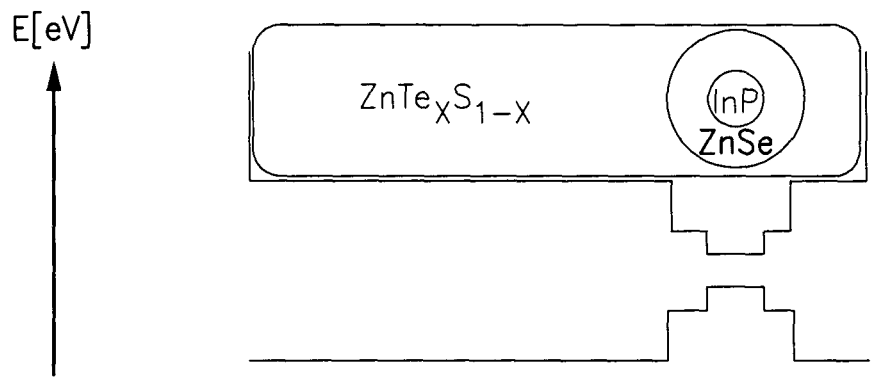
FIG. 9 is an illustration of band structure of InP\ZnSe\ZnTe$_x$S$_{1-x}$.

This example describes the synthesis of InP/ZnSe III-V/II-VI core/shell spherical seed embedded in a ZnTe$_x$S$_{1-x}$ rod shaped shell nanoparticles. InP/ZnSe quantum dots were synthesized by a drop-wise addition of Zn and Se precursors to the pre-synthesized InP cores. This was done either by alternating injections of the Zn and the Se precursors (using the layer-by-layer method) or by a continuous injection of a mixture of both precursors. Another possible method for achieving InP/ZnSe core/shell was by seeded growth of the ZnSe shell, in which the InP cores were mixed with the Se precursor and injected rapidly to a heated mixture of the Zn precursor and ligands (long chained amines, phosphoric acids, phosphineoxides, etc.) The resulting InP/ZnSe nanodots were used as seeds for the growth of ZnTe$_x$S$_{1-x}$ rod shaped shell. This phase too was realized by the same methods as described above. The anisotropic rod shaped shell was achieved by choosing specific ligands, which support anisotropic crystal growth. The Te and S ratios was such that the resulting nanostructure is of type I (FIG. 9).

Similarly, alloyed shell layers may be used for further control of the structural and optical properties.

Example A5: ZnSe/ZnTe/ZnTe$_x$S$_{1-x}$

This example describes the synthesis of ZnSe/ZnTe core/shell spherical seed embedded in a ZnTe$_x$S$_{1-x}$ rod shaped shell nanoparticles. ZnSe/ZnTe quantum dots were synthesized by a drop-wise addition of Zn and Te precursors to the pre-synthesized ZnSe cores. This was done either by alternating injections of the Zn and the Te precursors (using the LBL method) or by a continuous injection of a mixture of both precursors. Another possible method for achieving ZnSe/ZnTe core/shell was by seeded growth of the ZnTe shell, in which the ZnSe cores were mixed with the Te precursor and injected rapidly to a heated mixture of the Zn precursor and ligands (long chained amines, phosphoric acids, phosphineoxides, etc.). ZnSe/ZnTe is a type II system, which causes a significant redshift of the emission peak. By doing so, the emission peak was shifted into the visible range (band gap of ~2.0-2.4 eV) from the UV-blue emission of the bare ZnSe dots.

Figure 10:
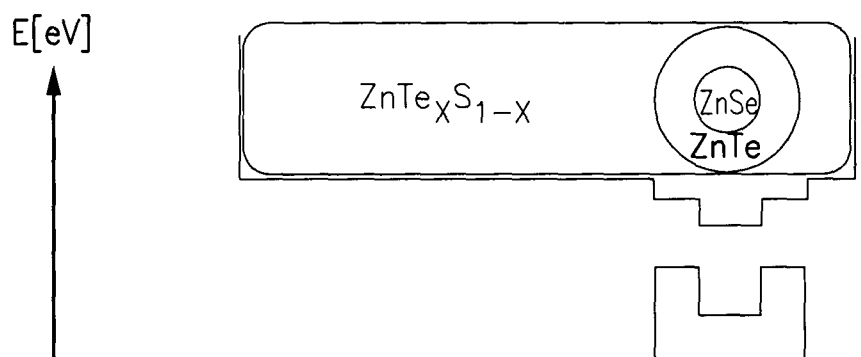
FIG. 10 is an illustration of band structure of ZnSe\ZnTe\ZnTe$_x$S$_{1-x}$.

The resulting ZnSe/ZnTe nanodots were used as seeds for the growth of ZnTe$_x$S$_{1-x}$ rod shaped shell. This phase too was realized by the same methods as described above. The anisotropic rod shaped shell was achieved by choosing specific ligands, which support anisotropic crystal growth. The Te and S ratios are such that the charge carriers are confined to the ZnSe/ZnTe core (FIG. 10).

Similarly, alloyed shell layers may be used for further control of the structural and optical properties.

A summary of various combinations of structures in accordance with the invention is presented in Table 1.

TABLE 1

A summary of various combinations of structures in accordance with the invention.

| material | Core | Buffer structure | Elongated structure | Emission Wavelength (nm) | Advantages (polarized emission in all cases) |
|---|---|---|---|---|---|
| InAs/CdSe/CdS | InAs | CdSe | CdS | 800-3300 | III-V II-VI combination + NIR |
| InAs/CdSe/ZnSe/CdS | InAs/CdSe | ZnSe | CdS | 800-3300 | III-V II-VI combination + NIR |
| InP/ZnTe/ZnS | InP | ZnTe | ZnS | 400-1080 | III-V II-VI combination + NIR + Cd Free |
| InP/ZnSe/ZnTe | InP | ZnSe | ZnTe | 400-950 | III-V II-VI combination + NIR + Cd Free |
| InP/ZnSe/CdS | InP | ZnSe | CdS | 400-950 | III-V II-VI combination + NIR |
| InP/ZnSe/ZnS | InP | ZnSe | ZnS | 400-950 | III-V II-VI combination + Vis + Cd Free |
| InP/ZnSe/ZnTe/ZnS | InP | ZnSe | ZnTe/ZnS | 400-950 | III-V II-VI combination + Red emission + Cd Free |
| ZnTe/ZnSe/ZnS | ZnTe | ZnSe | ZnS | 350-630 | Red light emitting Cd free nanorods |
| ZnSe/ZnTe/ZnS | ZnSe | ZnTe | ZnS | 350-630 | Blue - green light emitting Cd free nanorods |
| ZnSeTe/ZnTe/ZnS | ZnSeTe | ZnTe | ZnS | 350-630 | Blue - green light emitting Cd free nanorods |
| CdSe/CdSSe/CdS | CdSe | CdSSe | CdS | 400-750 | Visible emission, high QY, stability |
| CdSe/CdS/CdZnS | CdSe | CdS | CdZnS | 400-750 | Visible emission, high QY, stability |
| CdSe/CdZnSe/CdZnS | CdSe | CdZnSe | CdZnS | 400-750 | Visible emission, high QY, stability |
| CdSe/CdZnS/ZnS | CdSe | CdZnS | ZnS | 400-750 | Visible emission, high QY, stability |

Rod-in-Rod Seeded Rod Systems

Example B1: CdSe Rod in a CdS Rod

To benefit from the facile seeded growth approach, while further increasing the 1D characteristic of the combined heterostructures, the seeded rod-in-rod systems have been developed. One such example is the CdSe/CdS heterostructure. The innovative approach yields rods with high degree of linear polarization and with high photoluminescence (PL) quantum efficiencies. As demonstrated, there is now the ability to control the optical properties, and in particular the polarization of these structures, by tailoring the core rod length and diameter. Moreover, a study of the excitation wavelength dependence was performed, providing insight to the interplay between electric and dielectric contributions to the polarization properties of NRs.

CdSe/CdS rod-in-rod SRs were synthesized by injecting, e.g., swiftly injecting, a mixture of CdSe nanorods, and sulfur precursor into hot solution of cadmium precursor and two phosphonic acids in tri-n-octyl phosphine. The resulting rod-in-rod particles exhibit high emission quantum yields of up to 80% and improved polarization with respect to equivalent "sphere in a rod" systems, which is of the overall scale of nanorods.

Synthesis of CdSe/CdS rod-in-rod was done according to the seeded growth method reported by Carbone et al. [23] In the first step, CdSe rods of several different lengths and diameters were synthesized to serve as seeds [34]. The CdSe rods were cleaned by repetitive precipitation in a toluene/methanol mixture, mixed with elemental sulfur and dissolved in 1.5 g of tri-octyl phosphine (TOP). In the second seeded growth step, the seeds mixture was swiftly injected into a flask containing tri-octyl phosphine oxide (TOPO), hexyl phosphonic acid (HPA), octadecyl phosphonic acid (ODPA) and CdO, heated under argon atmosphere to 360° C. The reaction was kept at this temperature for a few minutes, after which the reaction flask was allowed to cool to room temperature, followed by separation of the rod-in-rod products from the growth solution.

Figures 12A, 12B:
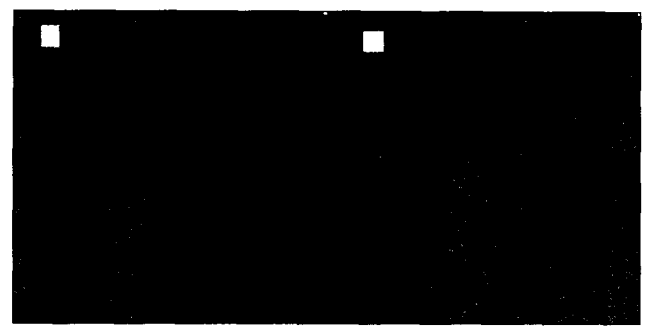
FIG. 12A-B are.
Figure 13:
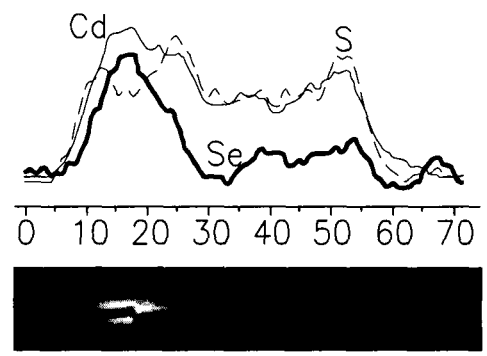
FIG. 13 provides the Energy Dispersive X-ray Spectroscopy (EDS line scan) of CdSe/CdS rod in a rod SR (CdSe core rod of 8 nm×2.4 nm and CdS outer rod of 45 nm×5 nm). X axis is length in nm. The position of the CdSe inner core rod is identified by the high concentration of Se which is apparent only between 15 nm and 25 nm (app. 5 nm from the position of the outer rod boundary, at 10 nm). The outer CdS rod is depicted by the Cd and S plateaus between 10 nm and 55 nm.

FIG. 12A shows TEM images of typical CdSe seeds (length of 8 nm and diameter of 2.4 nm) which were used as seeds for the synthesis of CdSe/CdS rods in rods shown in FIG. 12B (length of 45 nm and diameter of 5 nm). In this example, while the diameter grew only by 2.6 nm after the outer rod growth, the length grew much more significantly, by 37 nm. The position of the CdSe rod seed with in the CdS rod in this sample was obtained from energy dispersive X-ray line scan spectroscopy (FIG. 13), which indicates the material composition of a single particle along its main axis. The graph in FIG. 13 shows the relative amounts of cadmium, sulfur and selenium along the particle (x axis shows length in nm). In this sample, it can be seen that the inner CdSe rod, which can be identified by the selenium peak located between 15 and 25 nm, resides asymmetrically (non-concentrically) within the outer rod, which can be identified by the cadmium and sulfur plateaus from 10 to 55 nm.

Figure 14:
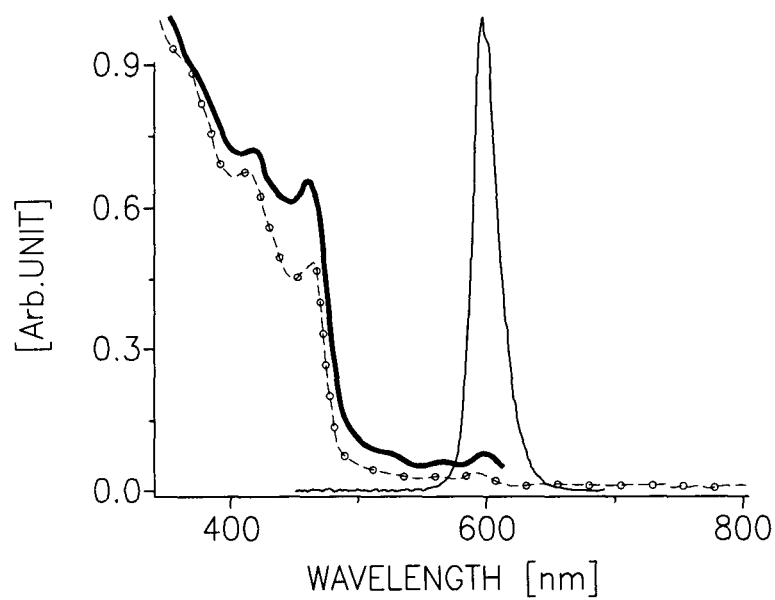
FIG. 14 depicts CdSe/CdS rod in a rod SRs (CdSe core rod of 8 nm×2.4 nm and CdS outer rod of 45 nm×5 nm) emission (thin solid line), absorption (dashed line) and photoluminescence emission (thick solid line).

Upon growth of CdS rod shell on top of the CdSe rod, a red shift accompanied by a large increase in the emission intensity of the particles was observed. The red shift is attributed to the decrease in the barrier for the wave functions in the core rod, leading to leakage of the electron and hole wavefunction to the outer shell which results in a decrease of the band gap. The increase in quantum yield is attributed to passivation of surface traps in the core by the CdS shell. FIG. 14 shows the absorption (dashed line), emission (thin solid line) and photoluminescence emission (thick solid line) of the CdSe/CdS rod-in-rod systems described above. Both photoluminescence emission and absorption show a distinctive peak at ~600 nm, followed by weaker peaks at 570 nm and at ~520 nm which are all attributed to electronic transitions in the CdSe inner rod (FIG. 15). These features, which are rarely seen in sphere in a rod seeded rods due to the low amounts of CdSe in the particles, are clearly seen in CdSe/CdS rod-in-rod systems of the invention and are more pronounced as the CdSe rods lengths and diameters increase. Both absorption and PLE are significantly increased for wavelengths lower than 480 nm, because of the onset of absorption into the CdS rod shell transitions.

Quantum efficiency measurements preformed on the rod-in-rod seeded rods have shown a high increase of the QY. In the sample described above (CdSe 8×2.4 nm in CdS 45×5), QY increased from ~4% in bare CdSe rods seeds to 78% in CdSe/CdS rod-in-rod SRs. Similar effects were seen also for longer inner seed rods. For example, in CdSe 23×3 nm embedded in CdS 56×5 QY increased from ~3% in bare CdSe rods seeds to 38% in CdSe/CdS rods in rods SRs). At least a one order of magnitude increase in the QY was obtained for all synthesized samples between the bare CdSe rod and the CdSe/CdS rod in rod, both when exciting to the CdSe states (excitation at 519 nm) and when exciting into the CdS states (at 470 nm).

FIGS. 16A-H show several examples of CdSe NRs which were used as seeds for formation of CdSe/CdS rod-in-rod systems. Comparing the images show thickening and elongation of the core/shell rod-in-rod systems with respect to the initial CdSe rods. For example, FIG. 16A shows TEM images of 6.5 nm×2.4 nm CdSe rods before, and after (FIG. 16B) the growth of CdS rod-shell. Upon shell growth the length of the rod increased to 15 nm and its thickness increased to 4.5 nm. The core and shell dimensions of several examples are summarized in Table 2.

TABLE 2

Various rod-in-rod systems (R@Rs) and core/shell systems (S@Rs) dimensions and spectroscopic charachteristics

| Sample | CdSe core length (nm) | CdSe core width (nm) | CdS shell length (nm) | CdS shell width (nm) | λ-PL (nm) | QY | Anisotropy in PS measurement | Modeled single particle PL polarization |
|---|---|---|---|---|---|---|---|---|
| R@R1 | 6.5 | 2.4 | 15 | 4.5 | 606 | 62% | 0.2293 | 0.71 |
| R@R2 | 9 | 2.2 | 40 | 3.8 | 597 | 76% | 0.2865 | 0.82 |
| R@R3 | 20 | 2.5 | 45 | 5.5 | 626 | 38% | 0.2974 | 0.82 |
| R@R4 | 40 | 2.5 | 60 | 5.2 | 632 | 36% | 0.2867 | 0.82 |
| S@R1 | 3.7 (diameter) | | 20 | 4.8 | 624 | 65% | 0.2015 | 0.65 |
| S@R2 | 3.9 (diameter) | | 65 | 5 | 627 | 42% | 0.2291 | 0.71 |

In S@Rs the core is usually positioned asymmetrically inside the rod, at around a quarter to a third of its length, because of the difference in growth rates of the different facets [23]. To determine the position of the CdSe rod within the shell, compositional mapping by scanning TEM electron dispersive X-ray spectroscopy (STEM-EDS) was performed on the R@Rs (FIG. 17A). The Cd composition was relatively uniform along the entire length of the nanorods, while the Se and S are concentrated at the middle and at the edges of the rod, respectively. In addition, the Se concentration was positioned asymmetrically along the rod, closer to one edge, resembling the behavior of the S@R system. These results, indicating the higher reactivity of the rods ends, are in also in agreement with previously reported syntheses of Cd chalcogenides columnar heterostructures, in which the rods ends acted as nucleation centers that promote the continuous growth of rod of other composition. However, in the seeded growth approach there is also growth of the shell over the entire seed, as can be deduced from the increase in thickness and from the significant improvement in fluorescence quantum yield.

Further indication for the CdSe rod position was obtained by applying selective gold growth over the R@Rs. Briefly, in this procedure gold growth is performed via a low-temperature reduction of AuCl$_3$ dissolved with seeded nanorods, dodecyl-amine (DDA) and dodecyl-dimethyl-ammonium bromide (DDAB) in toluene. As was shown in previous works [42,19], in CdSe/CdS S@Rs with a thin shell, a spherical gold dot is grown over the rod in proximity to the CdSe seed, marking its position along the rod.

This behavior was attributed to the tendency of the CdSe seed to act as a sink for electrons, thereby promoting Au growth in that region [19]. In contrast to the spherical Au dots which are formed in S@R systems, carrying out the procedure on R@Rs of 20 nm resulted in the growth of gold prolate ellipsoids over the CdS rods, elongated in the direction of the rod's main axis (FIG. 17B). The position of the gold ellipsoids along the roads closely matches the position of Se concentration along the rod obtained from the EDS measurements.

Figure 18A:
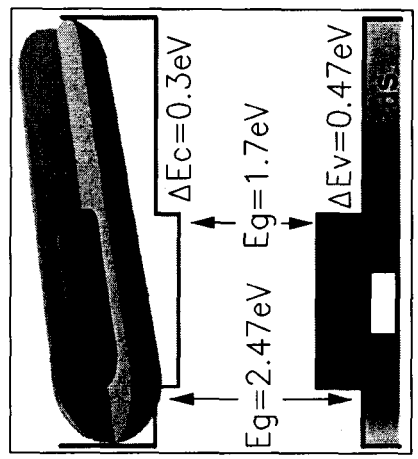
FIGS. 18A-C are.
Figure 18B:
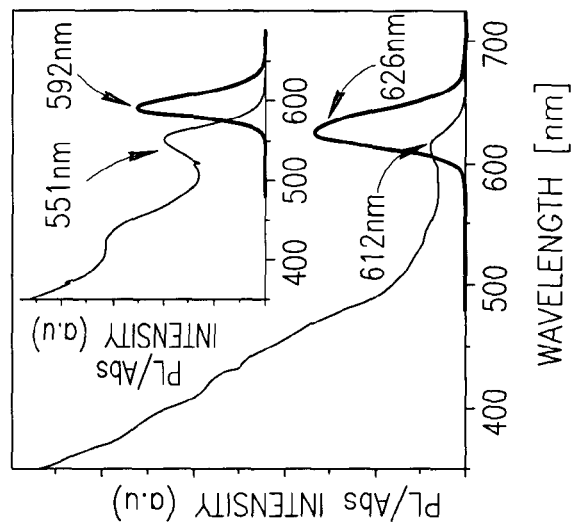
Figure 18C:
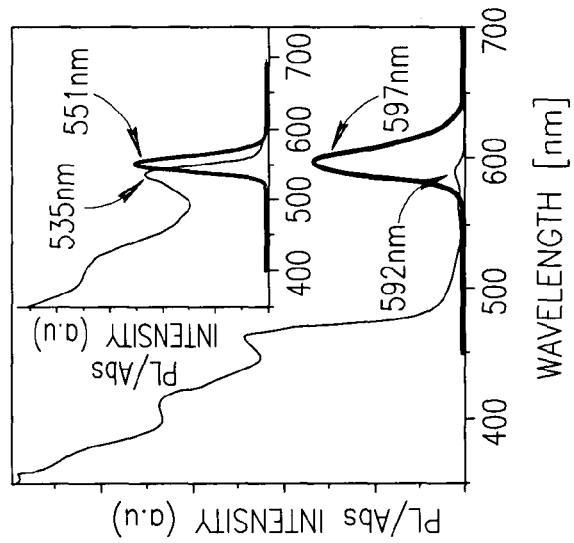
Figure 21:
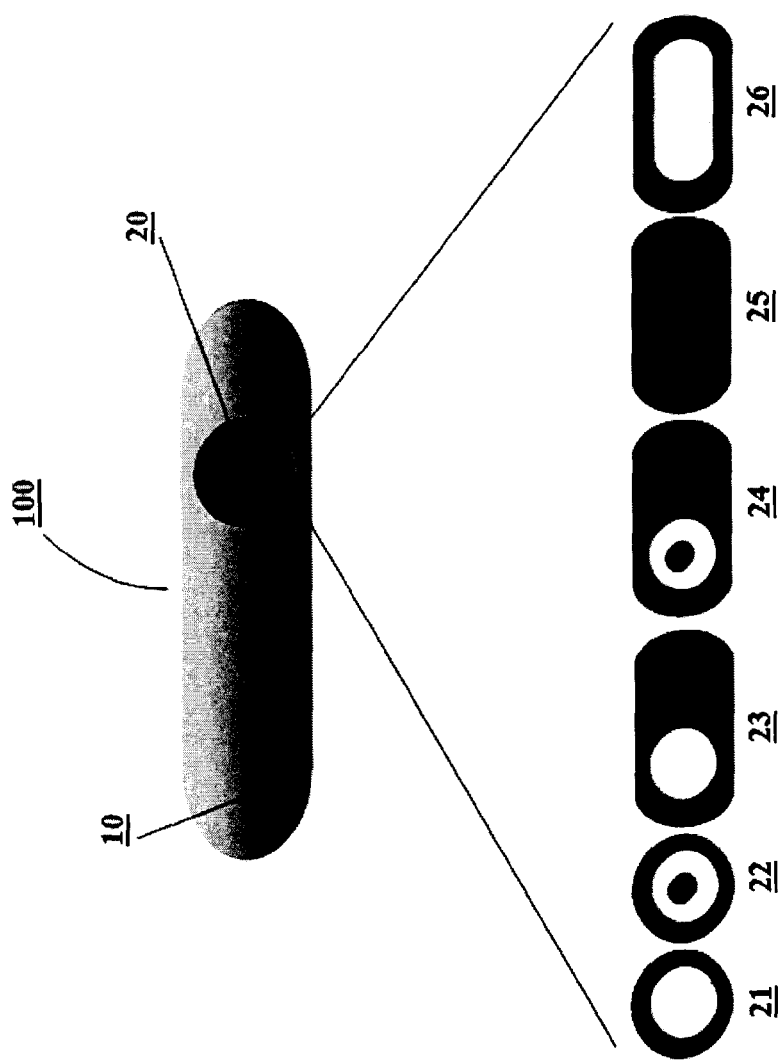
FIG. 21 presents a depiction of a seeded rod system according to an embodiment of the invention.
Figure 22:
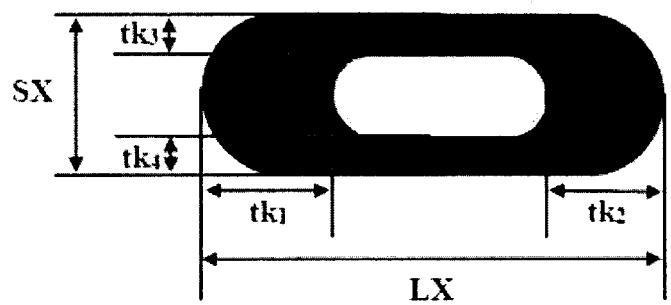
FIG. 22 presents the relative position of a seed structure within an elongated structure system of the invention.
Figure 23:
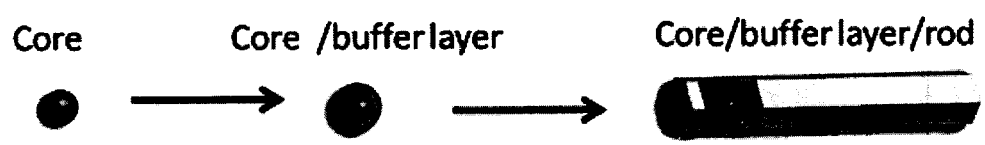
FIG. 23 depicts schematically a process for constructing seeded rod systems of the invention.

The buildup of the CdS shell was also apparent when comparing the absorbance and PL of the CdSe/CdS R@Rs to that of the bare CdSe rods seeds. FIG. 18A shows the absorption and emission of 9 nm×2.2 nm bare CdSe rods (inset) and of the same rods embedded in a 40 nm×3.8 nm CdS shell. Upon the growth of the shell, the emission peak red shifts from 551 nm to 597 nm. The shift was accompanied by large increase in quantum efficiency from 4.3% for the bare cores to a high value of 76% for the core/shell R@Rs (both excited at 510 nm). A red shift of the excitonic peak was also apparent in the absorption spectrum (from 535 nm to 592 nm). As in the case of S@R systems, the growth of the CdS shell was accompanied by an increase of the absorption at wavelengths below 500 nm, because of the onset of transitions in the CdS rod (FIG. 18C). However, in R@R systems, the absorption features of the CdSe are much more pronounced than in S@R systems, because of the relatively large volume of the CdSe core rods compared to dots. FIG. 18B shows the absorption and emission of 20 nm×2.5 nm bare CdSe rods (inset) and of the same rods embedded in a 45 nm×5.2 nm CdS shell. As in the previous system, a red shift is observed for both the emission peak (from 592 nm to 626 nm) and the absorption excitonic peak (from 551 nm to 612 nm). Quantum efficiency is increased from 2.3% for the bare cores to 38% for the core/shell R@Rs (both excited at 510 nm). Comparing the absorption spectra of both samples shows that the CdSe absorption features become more apparent as the volume ratio between the core and the shell decreases. In general, the quantum efficiencies of the samples become lower (from ~80 to ~35%) as the length of the core rod increases, consistent with the increased interfacial region between the core and the shell, leading to faster non-radiative decay rate, and with the reduced overlap between the electron and hole wave functions, leading to a decreased radiative decay rate.

One of the distinctive features of NRs is their linear polarized emission which is strongly dependent on the aspect ratio of the NRs [9,43,44,45]. In order to compare the degree of polarization of different R@R and S@R systems, the excitation photoselection (PS) method [46,47] was used, which does not depend on external factors such as degree of arrangement or polymer stretching, and only relies on the particles transition dipoles, thus enabling the comparison between the polarizations of different samples.

Within this method, an isotropic solution of randomly oriented particles is excited with polarized light. The strength of the dipole transition is proportional to $|\vec{\mu} \cdot \vec{E}|^2$. $|\vec{\mu} \cdot \vec{E}|^2$, where $\vec{\mu}$ is the dipole moment and $\vec{E}$ is the polarization of excitation field. As a consequence, only particles whose absorption transition dipole has a component parallel to the electric field vector of the excitation are selectively excited, with a probability proportional to the projection of the transition moments onto the light polarization axis. The selective excitation results in a partially oriented population of particles (photoselection) along the polarized excitation light axis. The emitted light, which is polarized along the emission transition dipole moment, is then collected and separated to its components parallel ($I_\parallel$) and perpendicular ($I_\perp$) to the polarization of the excitation. The anisotropy of the sample, r, is calculated by Eq. 1:

$$r = \frac{I_\parallel - I_\perp}{I_\parallel + 2I_\perp} \quad (1)$$

while its polarization, p, is calculated by Eq. 2:

$$p = \frac{I_\parallel - I_\perp}{I_\parallel + I_\perp} \quad (2)$$

For an isotropic solution of particles, the measured anisotropy can range from r=0.4 for particles whose excitation dipole moment is parallel to their emission dipole moment, to r=−0.2 for particles whose excitation dipole moment is perpendicular to their emission dipole moment. Particles which do not have a defined excitation or emission dipole moments show no anisotropy.

FIGS. 19A and 19B show the band-edge parallel and perpendicular polarized emission components (normalized by the parallel emission intensity) of CdSe/CdS core/shell and R@R respectively, both excited near the band-edge. As a reference, we chose the core/shell system (core diameter 3.5 nm, shell thickness of 0.8 nm), whose polarization should be very low due to the symmetric spherical shape of the particles [9]. As can be seen in FIG. 19A, the two components are nearly similar, and the calculated anisotropy is practically zero (~0.04). In comparison, for the R@R2 system, a much higher difference between the polarization components is observed, and anisotropy of 0.28 is obtained (FIG. 19B).

FIG. 19D summarizes the results obtained from photoselection anisotropy measurements of several S@R and R@R systems with different dimensions and ARs, excited using a vertically polarized light at the band edge (purple), at 530 nm, at 470 nm and at 350 nm. The emission was always measured at the red side of the band edge peak, and separated into the corrected vertical and horizontal components, from which the anisotropy was obtained. In agreement to previously published results showing polarized emission of single particle [20] and of aligned ensembles of CdSe/CdS S@Rs [20,23], an anisotropy of ~0.2 was obtained for the S@R systems. In general, the anisotropy obtained for R@R systems is 1.5 times higher than the anisotropy obtained for S@Rs (with the exception of the R@R1 system, whose anisotropy resembles that of S@Rs.

By analyzing the characteristics of the polarizations of the absorption and emission for the single nanoparticle, it is possible to perform a mapping from the single particle to the anisotropy of a randomly distributed ensemble of particles in solution. Briefly, for known absorption and emission polarization components of the single particle in the particle's coordinate system, (shown in FIG. 19C), the anisotropy of the ensemble can be obtained by averaging the projections of the single particle polarization in all possible orientations on to the lab axes (shown in FIG. 19C). A full description of the method for molecules appears elsewhere [47].

In rod shaped particles, the polarization components of both absorption and emission are dictated by the cylindrical symmetry, resulting in a z-component along the rod, and equal x and y components which display a planar polarization perpendicular to the rod. FIG. 20A shows a contour map of anisotropy obtained from photoselection as function of the single particle polarization of the absorption (horizontal axis) and of the emission (vertical axis) under assumption of equal weights of x and y components. For particles whose x, y and z components are similar (p=0) in both absorption and emission, such as completely spherical quantum dots, the obtained anisotropy is 0, while for a perfectly polarized particle (p=1 in both absorption and emission) the obtained anisotropy is 0.4. The bold lines on the contour describe the obtained anisotropies for the R@R3 system excited at the band edge and at 355 nm, and for S@R2 systems excited at the band edge and at 355 nm. For clarity only the results for these two samples are shown in the graph, as representatives of the other samples.

For band edge excitation and emission, further characterization of the polarization can be obtained by plausible assumptions. As was shown theoretically for NRs [48,44], and also experimentally for both NRs [9] and S@Rs [25], the lowest band-edge state of the core in these systems has a strong polarization along the main axis of the rod due to a predominant p character of the band-edge hole state. In the excitation, the electronic state polarization is accompanied by an additional dielectric effect, which strongly reduces the field polarized perpendicular to the rod's main axis while hardly affecting the field parallel to the main axis [49]. The combination of these two factors leads us to the plausible assumption that the band-edge excitation is almost completely polarized along the z-axis. The band edge emission is expected to be also highly polarized along the z axis, but not to the same extent as the absorption, because even though the electronic polarization effect still plays an important role, there is thermal occupation of higher emission states, which are not polarized along the rod, and a much smaller dielectric effect.

Under these assumptions, for the R@R system, an emission polarization of 0.82 (calculated according to Eq. 2) is obtained, in agreement with measured values for single CdSe rods (0.85) [9] and with theoretical calculations (0.86) [48,44]. Under the same assumptions, for S@Rs, an emission polarization of 0.71 is obtained, again slightly lower but still in good agreement with results obtained in single particle polarization measurements (0.75) [25]. The comparison to the single particle measurements indeed supports the assumption of a highly polarized absorption in these systems. The obtained emission polarization as a function of the core aspect ratio for the different systems is depicted in FIG. 20B.

The existence of polarization in S@R systems, albeit their emission emanates from the sphere core states, is attributed to the crystal field effect and to the cylindrical symmetry exerted by the CdS rod-shell on the electron and hole wave functions in the core [20]. As mentioned before, sample R@R1, which has a low aspect ratio shows a polarization similar to the S@R systems. This is in agreement with the results obtained for CdSe NRs, where the steep increase in polarization is obtained only at a specific AR [9], yet in the seeded rods system, polarization is already obtained due to the rod shell, thus the increase in polarization for samples with larger AR (indicated in FIG. 20B by dashed line) is much smaller than that seen in the transition from CdSe dots to rods, but it is still noticeable.

The assumption that the excitation is completely polarized along the z-axis does not hold for excitation above the band edge, because in this case the number of possible electronic transitions increases rapidly, and the electronic contribution to the polarization of the absorption decreases. Yet, the emission still occurs from the same band-edge states, and thus is expected to have the same polarization obtained under the band-edge excitation. Therefore, it is possible to assess also the polarization of the absorption at shorter wavelengths. Interestingly, even for absorption at short wavelengths such as 355 nm, where no polarization is expected to be induced from the electronic states, a noticeable anisotropy is obtained. This polarization is mainly attributed to the dielectric effect, as was previously reported for nanowires [49]. FIG. 20C presents the obtained absorption polarizations for excitation at 530 nm, 470 nm, and 350 nm. In general, as the excitation wavelength decreases, the excitation polarization also decreases, in consistence with the decrease in the electronic polarization contribution. However, the excitation polarizations for all seeded rod samples have almost the same value. For excitation at 530 nm and at 470 nm, the polarization obtained is relatively high (0.70-0.75). However, for excitation at 350 nm, lower polarization is obtained (0.63). The higher polarizations obtained at 530 nm and 470 nm can be attributed to the fact that these excitations already include transitions to CdS rod shell band-edge states, which are common to all seeded rods samples, while the excitation at 350 nm already involves transitions to much higher CdS states. Due to the rod structure, the CdS band-edge states should also exhibit high polarization along the main axis of the rod, and thus the transitions involving these states exhibit relatively high polarization. However, for the excitation at 350 nm, the electronic effect becomes negligible, and the polarization obtained is mostly a result of the dielectric effect. The polarization value obtained (~0.6) is in very good agreement with theoretical values obtained for CdS rods (see supporting information for further details). The ability to retain the polarization even at lower excitation wavelength is unique to such NR systems, and can be used for a wide range of applications including bio-labeling and displays.

Seeded R@R particles combine the ease of synthesis, strong emission quantum yields and good surface passivation which are associated with seeded growth particles, along with properties which are associated with NRs, including large absorbance cross-sections and high linear polarization. The ability to tune their polarization and emission wavelength by tuning the dimensions of the rod seed make R@Rs interesting for a variety of optical and optoelectronic usages and applications, and provide an example for the ability to design and control the properties of nanostructures through colloidal synthesis.

In order to compare the polarization of spheres in rods and rod-in-rod samples, measurements were performed using the photo-selection method. Within this method, a sample of SRs is dissolved in hexane, and then excited using light with vertical polarization. The emitted light from the particles is collected and separated to its vertical and horizontal polarization components. If the particles have a distinctive linear transition dipole moment, particles oriented along the excitation polarization have higher probability to get excited, and if the excitation probability of different particles is similar, by analyzing their emission it is possible to compare their polarization. Rod in a rod exhibit absorption polarization parallel to the rod's main axis in short wavelength (below 480 nm) due to their dielectric confinement. Comparing their emission when excited at 470 nm and 355 nm shows that rods in rods exhibit higher emission polarization than sphere in rods. This effect is even more pronounced when the systems are excited to their band-edge, where rods in rods have higher absorption polarization due to their electronic structure which is induced by the rod shape. In the band edge, the emission polarization of the rods in rods is ~1.5 times higher than that of spheres in rods, and it increases as the inner rod length increase.

Example B2: InP Core within ZnTe Rod Used as Seed for ZnS Rod Shell

Figure 11:
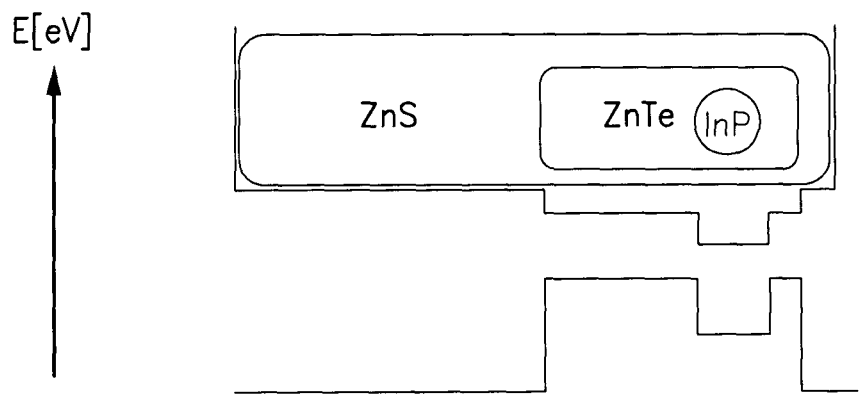
FIG. 11 is an illustration of band structure of InP\ZnTe\ZnS.

Pre-synthesized InP cores were used as seeds for ZnTe rod shaped shell. The resulting InP/ZnTe type II seeded rods are used as seeds for a ZnS rod shaped shell for receiving rod in rod particles (FIG. 11). ZnTe rod shaped shell is grown on top of the pre-synthesized InP cores through the seeded growth method, in which the InP cores are mixed with the Te precursor and injected rapidly to a heated mixture of the Zn precursor and ligands (long chained amines, phosphoric acids, phosphineoxides, etc.).

The ZnS closing shell is produced either by alternating injections of the Zn and the S precursors (SILAR) or by a continuous injection of a mixture of both precursors. Another possible method seeded growth in which the ZnSe/ZnTe cores are mixed with the S precursor and injected rapidly to a heated mixture of the Zn precursor and ligands (long chained amines, phosphoric acids, phosphineoxides, etc.).

The invention claimed is:

1. A seeded rod (SR) nanostructure comprising an elongated structure embedding a single seed structure, said single seed structure being selected from the group consisting of an elongated shaped core/shell structure, an elongated shaped core/multishell structure, and a single-material rod element,
wherein:
the thickness of the elongated structure material embedding said seed structure along one axis (tk1, tk2) is at least three times as large as the thickness (tk3, tk4) along the other axis;
one or both of tk3 and tk4 has a thickness between 0.8 and 1.5 nm; and
at least one material of elongated structure and the seed structure is independently selected from the group consisting of a semiconductor material, an insulator material, and a metal oxide material,
wherein
the elongated structure has a long axis and a short axis, the long axis being orthogonal to the short axis and having a length that is longer than a length of the short axis; and
the elongated structure has a first thickness (tk1), a second thickness (tk2), a third thickness (tk3), and a fourth thickness (tk4);
tk1 is a thickness of the elongated structure from a first outer surface of the elongated structure to an outer surface of the seed structure along the long axis;
tk2 is a thickness of the elongated structure from a second outer surface of the elongated structure, which is opposite to the first outer surface, to an outer surface of the seed structure along the long axis;
tk3 is a thickness of the elongated structure from a third outer surface of the elongated structure to an outer surface of the seed structure along the short axis;
tk4 is a thickness of the elongated structure from a fourth outer surface of the elongated structure, which is opposite to the third outer surface, to an outer surface of the seed structure along the short axis;
one or both of tk1 and tk2 is at least three times as large as one or both of tk3 and tk4; and
wherein the peak structure in the XRD spectrum of the seed structure is different from the peak structure in the XRD structure of the elongated structure embedding a single seed structure.

2. The nanostructure according to claim 1, wherein the material of said elongated structure and the material of said seed structure is selected, independently, amongst semiconductor materials.

3. The nanostructure according to claim 2, wherein the semiconductor material is a Group III-V material selected from the group consisting of InAs, InP, InN, GaN, InSb, InAsP, InGaAs, GaAs, GaP, GaSb, AlP, AlN, AlAs, AlSb, CdSeTe, ZnCdSe, and any combination thereof.

4. The nanostructure according to claim 1, wherein the elongated shaped core/shell structure is positioned concentrically or non-concentrically within the elongated structure.

5. The nanostructure according to claim 4, wherein the elongated shaped core/shell structure has an aspect ratio larger than 1.8.

6. The nanostructure according to claim 1, wherein:
the elongated structure comprises a first material,
the seed structure being an elongated shaped core/shell structure such that the core of the elongated shaped core/shell structure comprises a second material,
at least one shell of the elongated shaped core/shell structure independently comprises a further material, and
each of said first, second, and further materials is selected such that adjacent materials are different from each other.

7. The nanostructure according to claim 6, wherein a further material of the at least one shell is selected to have a polymorphic crystal form to enable anisotropic growth thereonto.

8. The nanostructure according to claim 7, wherein:
the material enabling anisotropic growth has a cubic or a non-cubic crystal structure, and
the non-cubic structure is selected from the group consisting of hexagonal, monoclinic, orthorhombic, rhombohedral, and tetragonal crystal structure.

9. The nanostructure according to claim 6, in each of the first material, the second material, and the further materials comprises an element of Group IIIB, IVB, VB, VIB, VIIB, VIIIB, IB, IIB, IIIA, IVA or VA of block d of the Periodic Table of the Elements.

10. The nanostructure cording to claim 9, wherein each of the first material, the second material, and the further materials comprises a Group III-V semiconductor material selected from the group consisting of InAs, InP, InN, GaN, InSb, InAsP, InGaAs, GaAs, GaP, GaSb, AlP, AlN, AlAs, AlSb, CdSeTe, ZnCdSe, and any combination thereof.

11. The nanostructure according to claim 1, wherein the semiconductor is selected from the group consisting of InAs/CdSe/CdS, InP/ZnTe/ZnS, InP/ZnSe/ZnTe, InP/ZnSe/CdS, InP/ZnSe/ZnS, ZnTe/ZnSe/ZnS, ZnSe/ZnTe/ZnS, ZnSeTe/ZnTe/ZnS, CdSe/CdSSe/CdS, CdSe/CdS/CdZnS, CdSe/CdZnSe/CdZnS, and CdSe/CdZnS/ZnS.

12. The nanostructure according to claim 1, wherein the seed structure is a single-material rod element; and the rod element is positioned concentrically or non-concentrically in the elongated structure.

13. The nanostructure according to claim 12, wherein the rod element is positioned non-concentrically in the elongated structure.

14. The nanostructure according to claim 12, wherein:
the rod element is positioned concentrically in the elongated structure; and a thickness of the elongated structure along one axis, in comparison to the other axis, is substantially different.

15. A process for manufacturing the seeded rod nanostructure according to claim 1, the process comprising contacting the seed structure in solution with at least one precursor of the material of the elongated structure under conditions permitting elongated growth of said elongated structure material onto a surface of the seed structure to thereby obtain the seeded rod nanostructure.

16. A device comprising the nanostructure according to claim 1.

17. The nanostructure according to claim 1, wherein the single seed structure and the elongated structure do not comprise CdSe, CdS, CdTe, CdZnSe, CdSeTe, or ZnCdSe.

* * * * *